United States Patent
Ando et al.

(10) Patent No.: US 10,793,032 B2
(45) Date of Patent: Oct. 6, 2020

(54) VEHICLE SEAT WITH PELVIS MOVEMENT SUPPRESSION

(71) Applicant: TOYOTA JIDOSHA KABUSHIKI KAISHA, Toyota-shi, Aichi-ken (JP)

(72) Inventors: Tatsunori Ando, Nagakute (JP); Katsunori Yamada, Toyota (JP); Mitsuaki Gotoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/205,750

(22) Filed: Nov. 30, 2018

(65) Prior Publication Data

US 2019/0193609 A1    Jun. 27, 2019

(30) Foreign Application Priority Data

Dec. 25, 2017    (JP) .................................. 2017-248410

(51) Int. Cl.
*B60N 2/427*    (2006.01)
*B60N 2/02*    (2006.01)
*B60N 2/42*    (2006.01)

(52) U.S. Cl.
CPC ......... *B60N 2/4279* (2013.01); *B60N 2/0276* (2013.01); *B60N 2/4214* (2013.01); *B60N 2/42763* (2013.01)

(58) Field of Classification Search
CPC .......................... B60N 2/42763; B60N 2/4279
See application file for complete search history.

(56) References Cited

U.S. PATENT DOCUMENTS

| | | | |
|---|---|---|---|
| 6,050,635 A * | 4/2000 | Pajon ................... | B60N 2/4221 297/216.1 |
| 6,254,181 B1 * | 7/2001 | Aufrere ............... | B60N 2/4221 297/216.1 |
| 6,386,631 B1 * | 5/2002 | Masuda ............... | B60N 2/4221 297/216.1 |
| 6,557,935 B2 * | 5/2003 | Choi .................... | B60N 2/4221 297/216.1 |
| 6,648,409 B1 * | 11/2003 | Laporte ............... | B60N 2/4221 297/216.1 |
| 6,746,077 B2 | 6/2004 | Klukowski | |

(Continued)

FOREIGN PATENT DOCUMENTS

JP    H05-286386 A    11/1993
JP    H05-286387 A    11/1993

(Continued)

*Primary Examiner* — David R Dunn
*Assistant Examiner* — Tania Abraham
(74) *Attorney, Agent, or Firm* — Oliff PLC

(57) ABSTRACT

A vehicle seat includes a pelvis movement suppression member, a moving mechanism, a control section and an energy-absorbing mechanism. The pelvis movement suppression member is disposed at a seat upper side of a seat front side of a seat cushion, extends in a seat width direction, and is movable in a seat front-rear direction relative to a frame of the seat cushion. The moving mechanism moves the pelvis movement suppression member from an initial position to a restraining position at a seat rear side relative to the initial position. When a collision is detected or predicted, the control section activates the moving mechanism and moves the pelvis movement suppression member to the restraining position.

8 Claims, 18 Drawing Sheets

(56) References Cited

U.S. PATENT DOCUMENTS

| | | | | |
|---|---|---|---|---|
| 7,413,246 B2 * | 8/2008 | Saiguchi | ............ | B60N 2/4221 |
| | | | | 297/216.1 |
| 7,866,696 B2 * | 1/2011 | Wang | .................. | B60R 21/21 |
| | | | | 280/748 |
| 8,061,770 B2 * | 11/2011 | Houston | ............ | B60N 2/4221 |
| | | | | 297/216.2 |
| 8,240,758 B2 * | 8/2012 | Combest | ............ | B60N 2/4221 |
| | | | | 297/216.16 |
| 8,573,691 B2 * | 11/2013 | Masutani | ............ | B60N 2/4221 |
| | | | | 297/216.1 |

FOREIGN PATENT DOCUMENTS

| | | | |
|---|---|---|---|
| JP | 2001-146127 A | 5/2001 |
| JP | 2002-240608 A | 8/2002 |
| JP | 2002-370569 A | 12/2002 |
| JP | 2008-049717 A | 3/2008 |

\* cited by examiner

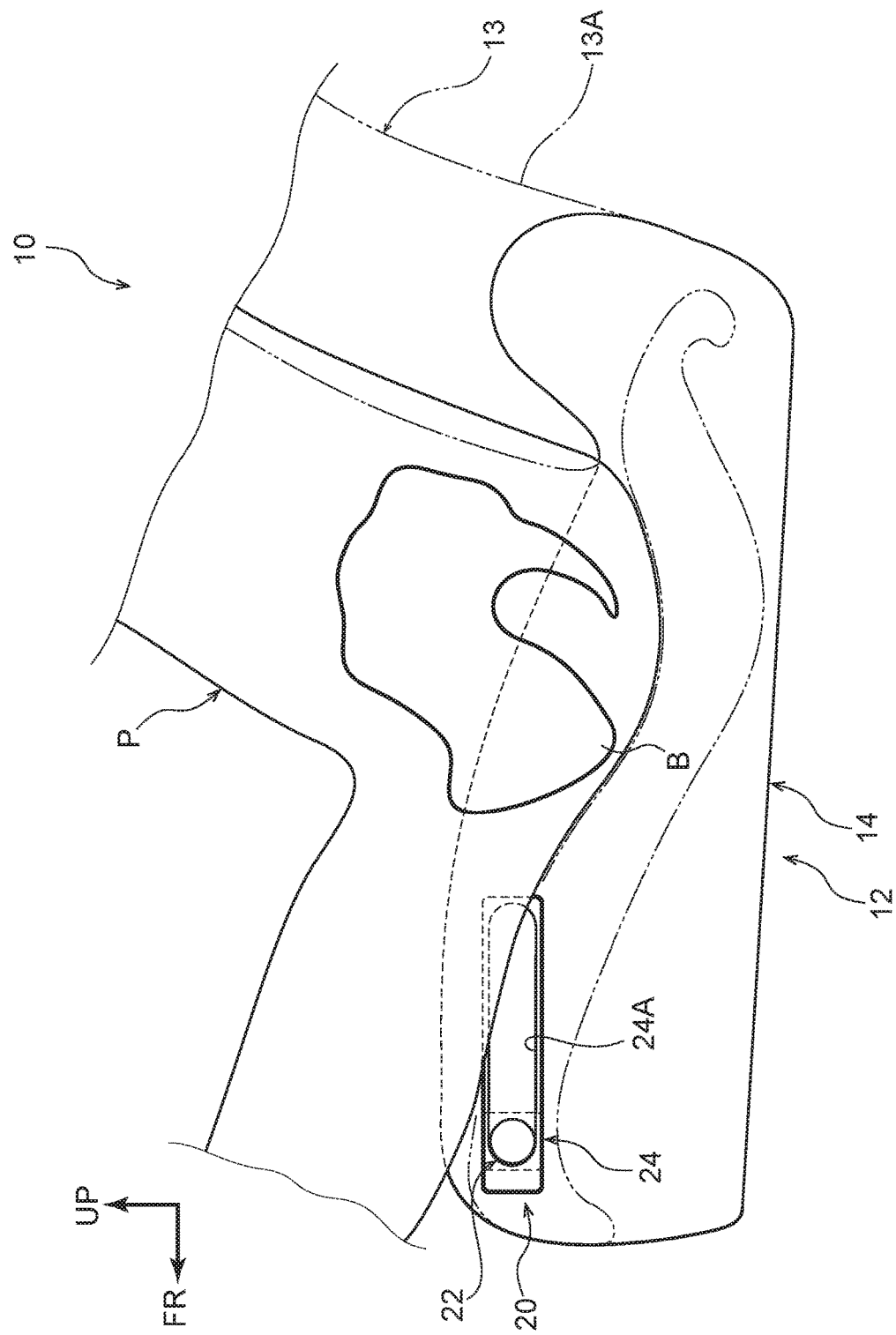

VEHICLE SEAT WITH PELVIS MOVEMENT SUPPRESSION

CROSS-REFERENCE TO RELATED APPLICATION

This application is based on and claims priority under 35 USC 119 from Japanese Patent Application No. 2017-248411 filed on Dec. 25, 2017, the disclosure of which is incorporated by reference herein.

BACKGROUND

Technical Field

The present disclosure relates to a seat for a vehicle.

Related Art

Japanese Patent Application Laid-Open (JP-A) No. 2002-370569 discloses a vehicle seat in which a slide preventing bar that serves as a pelvis movement suppression member is provided at a lower portion of a seat cushion. JP-A Nos. 2002-240608 and 2001-146127 disclose vehicle seats in which a stopper member that is movable only in a vertical direction is provided inside a seat cushion.

JP-A No. 2002-370569 gives a structure in which the slide preventing bar is moved toward the seat upper side by a force-generating apparatus during a collision of a vehicle, thus pushing up a seat cushion pad and suppressing the submarining effect. JP-A Nos. 2002-240608 and 2001-146127 give structures in which, when a seat occupant acts to move toward the seat front during a collision of the vehicle, lowering of the stopper member is prevented and the movement of the seat occupant toward the seat front is suppressed. However, in JP-A No. 2002-370569, the pelvis movement suppression member suddenly moves from a lower portion toward an upper portion of the seat cushion during the collision of the vehicle. Meanwhile, in JP-A Nos. 2002-240608 and 2001-146127, because the stopper member is movable only in the seat vertical direction, a load that is applied when the seat occupant acts to move toward the seat front during the collision may not be absorbed. Thus, there is scope for improvement in regard to moderating a load against the seat occupant.

SUMMARY

The present invention is to provide a vehicle seat that may both suppress submarining and moderate a load against a seat occupant during a collision.

Solution to Problem

A vehicle seat according to a first aspect includes: a pelvis movement suppression member that is disposed at a seat upper side of a seat front side of a seat cushion, extends in a seat width direction, and is movable in a seat front-rear direction relative to a frame of the seat cushion; a moving mechanism that moves the pelvis movement suppression member from an initial position to a restraining position at a seat rear side relative to the initial position; a control section that, when a collision is detected or predicted, activates the moving mechanism and moves the pelvis movement suppression member to the restraining position; and an energy-absorbing mechanism that, when a load in a direction from the restraining position toward the initial position acts on the pelvis movement suppression member subsequent to the movement by the moving mechanism, absorbs at least a portion of the load.

In this vehicle seat, the pelvis movement suppression member is disposed at the seat front side of the seat upper side of the seat cushion, and the pelvis movement suppression member extends in the seat width direction. The pelvis movement suppression member is movable in the seat front-and-rear direction relative to the frame of the seat cushion (a seat cushion frame), and can be moved by the moving mechanism from the initial position at the seat front side to the restraining position at the seat rear side. When a collision that would move a seat occupant toward the seat front side is predicted or detected, the moving mechanism is activated by the control section and the pelvis movement suppression member is moved to the restraining position at the seat rear side. Hence, movement of the seat occupant toward the seat front side may be suppressed by the pelvis movement suppression member that has been moved to the restraining position. Thus, submarining may be suppressed.

The energy-absorbing mechanism is provided that, when a load in the direction from the restraining position toward the initial position acts on the pelvis movement suppression member after the movement by the moving mechanism, absorbs at least a portion of this load. Therefore, in a situation in which the pelvis movement suppression member is being pushed in the direction toward the initial position by the pelvis area of the seat occupant, at least a portion of the load from the pelvis area may be absorbed by the energy-absorbing mechanism. Thus, a load against the seat occupant may be moderated.

In a vehicle seat according to a second aspect, the first aspect further includes a stopper mechanism that anchors the pelvis movement suppression member at the initial position, and when a collision is detected or predicted, the control section releases the pelvis movement suppression member from a state of being anchored by the stopper mechanism.

In this vehicle seat, in a usual state prior to activation of the moving mechanism, the pelvis movement suppression member is anchored at the initial position by the stopper mechanism. Therefore, movement of the pelvis movement suppression member from the initial position may be suppressed.

In a vehicle seat according to a third aspect, in the first aspect or the second aspect, a support portion is provided at each end portion of the pelvis movement suppression member, the support portions being movable in the seat front-rear direction relative to the frame, and the pelvis movement suppression member is moved from the initial position to the restraining position by the moving mechanism moving at least one of the support portions toward the seat rear side.

In this vehicle seat, the pelvis movement suppression member is moved via the support portion. Therefore, the moving mechanism may be disposed at each of the two end portions of the pelvis movement suppression member. Accordingly, the moving mechanism may be made smaller in size than in a structure in which a moving mechanism is disposed at a seat width direction central portion of a pelvis movement suppression member and moves the pelvis movement suppression member directly.

In a vehicle seat according to a fourth aspect, in the first aspect or the second aspect, a support portion is provided at each end portion of the pelvis movement suppression member, the support portions being swingable in the seat front-rear direction relative to the frame, and the pelvis movement suppression member is moved from the initial position to the restraining position by the moving mechanism swinging at least one of the support portions toward the seat rear side.

In this vehicle seat, the pelvis movement suppression member is moved via the support portion. Therefore, the moving mechanism may be disposed at each of the two end portions of the pelvis movement suppression member. Further, because the pelvis movement suppression member is moved to the restraining position by swinging of the support portion, the pelvis movement suppression member may be moved by a simpler structure than a sliding structure.

In a vehicle seat according to a fifth aspect, in any one of the first to fourth aspects, in plan view, the pelvis movement suppression member is formed in a U shape that protrudes toward the seat front side.

In this vehicle seat, even if the seat occupant moves diagonally forward relative to the seat by inertia during a collision, the movement of the seat occupant may be suppressed by the pelvis movement suppression member. The meaning of the term "U shape" as used herein is not intended to be limited to shapes that are curved so as to form a shape protruding to the seat front side but to broadly encompass shapes that are inflected so as to form a shape protruding to the seat front side.

In a vehicle seat according to a sixth aspect, in any one of the first to fifth aspects, an energy absorption direction according to the energy-absorbing mechanism is a horizontal direction or a forward-upward direction that gradually approaches the seat upper side on progression toward the seat front side.

In this vehicle seat, a case of the pelvis area of the seat occupant riding over the pelvis movement suppression member may be suppressed compared to a structure in which an energy absorption direction by an energy-absorbing mechanism is a front-downward direction (a direction steadily approaching the seat lower side toward the seat front side).

In a vehicle seat according to a seventh aspect, in any one of the first to sixth aspects, the pelvis movement suppression member at the initial position is disposed at a location that, seen in the seat front-rear direction, is configured to overlap with ischial bones of a seat occupant.

In this vehicle seat, the ischial bones of the seat occupant may be supported by the pelvis movement suppression member being moved substantially horizontally from the initial position to the restraining position. Therefore, backward tilting of the pelvis may be suppressed without the pelvis area being pushed up.

A vehicle seat according to an eighth aspect includes: a pelvis movement suppression member that is disposed at a seat upper side of a seat front side of a seat cushion, extends in a seat width direction, and is movable in a seat front-rear direction relative to a frame of the seat cushion; a moving mechanism that moves the pelvis movement suppression member from an initial position to a restraining position at a seat rear side relative to the initial position, the pelvis movement suppression member being configured to support ischial bones of a seat occupant at the restraining position; a stopper mechanism that anchors the pelvis movement suppression member at the restraining position; and a control section that, when a collision is predicted, activates the moving mechanism, moves the pelvis movement suppression member to the restraining position, and anchors the pelvis movement suppression member at the restraining position with the stopper mechanism.

In this vehicle seat, the pelvis movement suppression member is movable in the seat front-and-rear direction relative to the frame of the seat cushion, and can be moved by the moving mechanism from the initial position at the seat front side to the restraining position at the seat rear side, at which the pelvis movement suppression member may support the ischial bones of a seat occupant. When a collision that would move the seat occupant toward the seat front side is predicted, the moving mechanism is activated by the control section and the pelvis movement suppression member is moved to the restraining position at the seat rear side. In addition, the pelvis movement suppression member is anchored at the restraining position by the stopper mechanism. Hence, movement of the seat occupant toward the seat front side may be suppressed. Moreover, because the ischial bones of the seat occupant are put into a state of being braced from the seat front side by the pelvis movement suppression member when the collision is predicted, a load against the seat occupant may be moderated compared to a structure in which a seat occupant who is moving by inertia is caught by a pelvis movement suppression member.

As described above, according to the vehicle seats according to the first aspect and the eighth aspect, both submarining may be suppressed and a load against a seat occupant may be moderated during a collision.

According to the vehicle seat according to the second aspect, the pelvis movement suppression member may be maintained at the initial position in a usual state prior to activation of the moving mechanism.

According to the vehicle seat according to the third aspect, space may be saved compared to a structure in which a pelvis movement suppression member is moved directly.

According to the vehicle seat according to the fourth aspect, space may be saved compared to a structure in which a pelvis movement suppression member is moved directly, in addition to which the pelvis movement suppression member may be moved by a simple structure.

According to the vehicle seat according to the fifth aspect, even when a seat occupant is moved by inertia diagonally forward relative to the seat, both submarining may be suppressed and a load against the seat occupant may be moderated.

According to the vehicle seat according to the sixth aspect, a restraining state in which the pelvis movement suppression member restrains the pelvis area of the seat occupant may be excellently maintained.

According to the vehicle seat according to the seventh aspect, a case of the pelvis tilting backward and restraining force from a lap belt (seatbelt) decreasing may be suppressed.

BRIEF DESCRIPTION OF THE DRAWINGS

Exemplary embodiments of the present disclosure will be described in detail based on the following figures, wherein:

FIG. 3 is an enlarged side view showing the seat cushion structuring the vehicle seat according to the first exemplary embodiment, which is a view showing a state in which the pelvis movement suppression member is disposed at an initial position.

DETAILED DESCRIPTION

First Exemplary Embodiment

Figure 1:
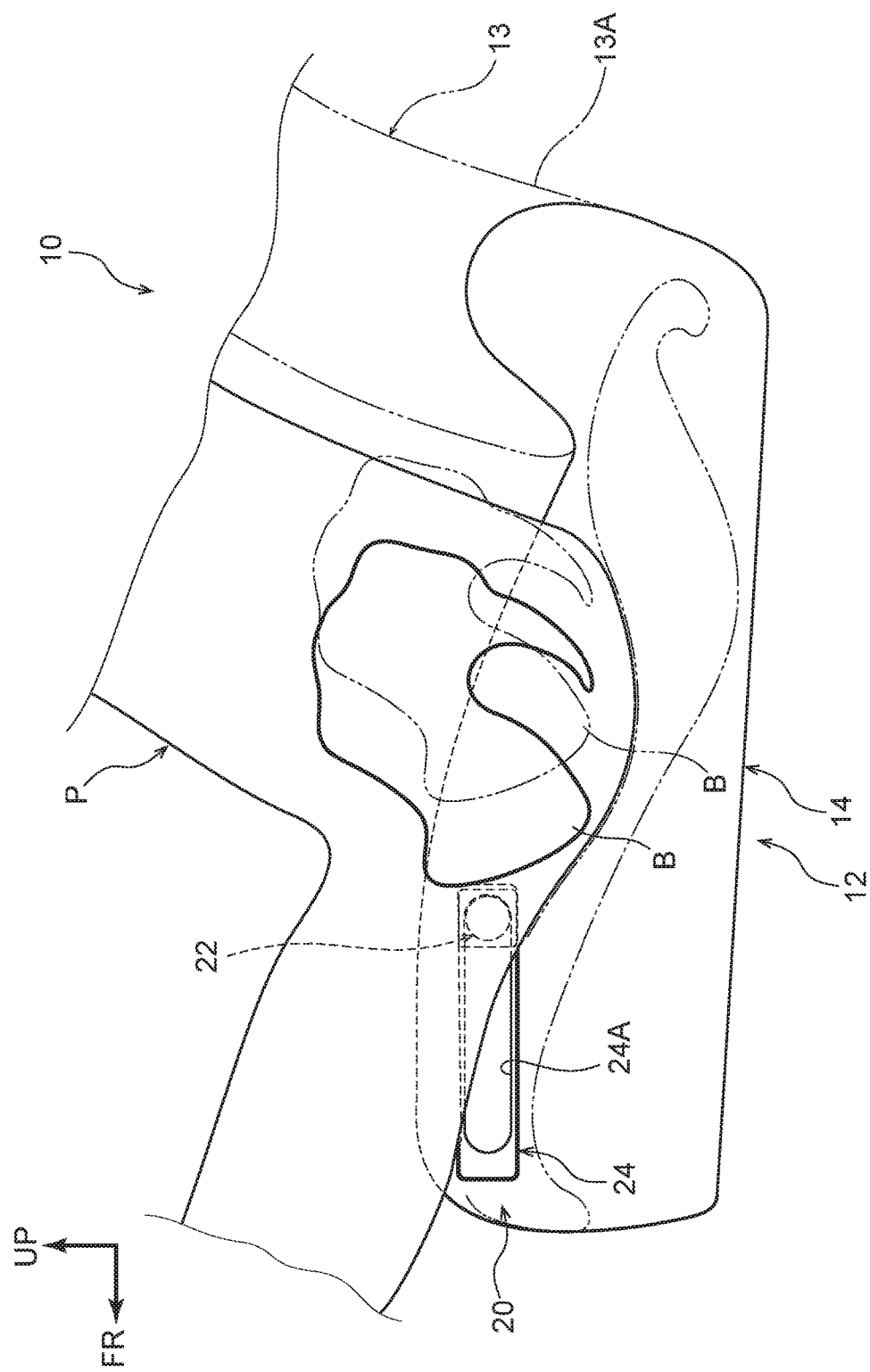
FIG. 1 is an enlarged side view showing a seat cushion structuring a vehicle seat according to a first exemplary embodiment, which is a view showing a state in which a pelvis movement suppression member has moved to a restraining position.

A vehicle seat 10 according to a first exemplary embodiment is described below using FIG. 1 to FIG. 9. An arrow FR that is shown where appropriate in the drawings indicates a vehicle front direction, an arrow UP indicates a vehicle upper direction, and an arrow RH indicates a vehicle right direction. Below, where descriptions are given using directions to front and rear, left and right, and up and down, unless particularly specified, these refer to front and rear in the vehicle front-and-rear direction, left and right in the vehicle left-and-right direction (the vehicle width direction), and up and down in the vehicle vertical direction.

—Overall Structure of the Vehicle Seat—

As shown in FIG. 1, the vehicle seat 10 according to the present exemplary embodiment is provided with a seat cushion 12. The buttock area and thigh area of a seat occupant P sitting on the vehicle seat 10 are supported by the seat cushion 12. A lower end portion 13A of a seat back 13 is connected to a rear end portion of the seat cushion 12. The back area of the seat occupant P is supported by the seat back 13. As an example in the present exemplary embodiment, the front-and-rear direction, left-and-right direction (width direction) and vertical direction of the vehicle seat 10 match the front-and-rear, left-and-right and vertical directions of the vehicle in which the vehicle seat 10 is mounted.

A seatbelt, which is not shown in the drawings, is provided at the vehicle seat 10. The seatbelt includes a shoulder belt that restrains the upper body of the seat occupant and a lap belt that restrains the pelvis area of the seat occupant. Thus, the seat occupant P may be restrained at the vehicle seat by the seatbelt.

Figure 2:
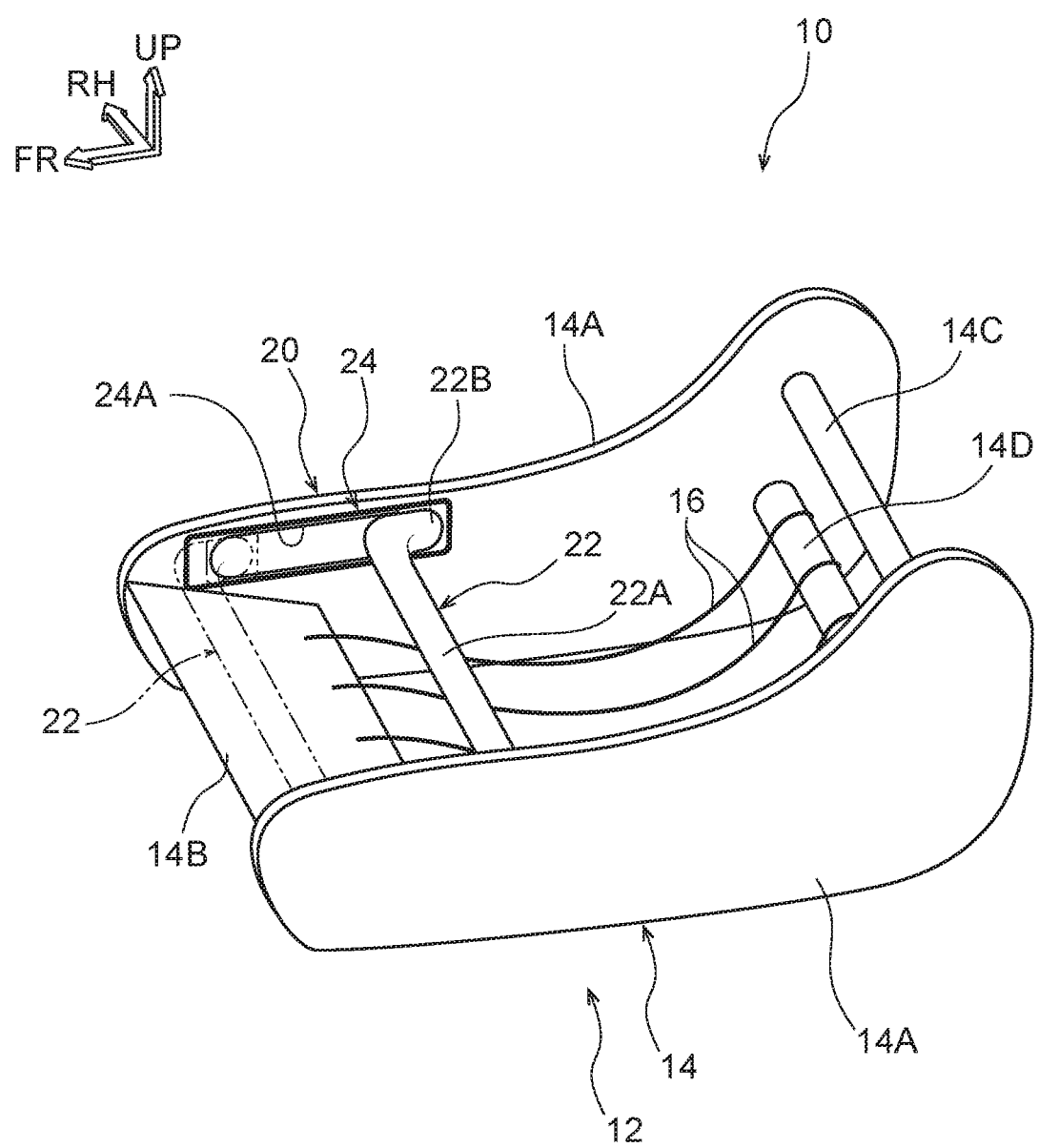
FIG. 2 is a perspective view showing principal elements of the seat cushion structuring the vehicle seat according to the first exemplary embodiment.

As shown in FIG. 2, the seat cushion 12 includes a seat cushion frame 14, which is a framework member, and plural seat cushion springs 16, which are attached to the seat cushion frame 14.

The seat cushion frame 14 is provided with a left and right pair of side frames 14A, a front frame 14B, and an upper and lower pair of rear frames 14C and 14D. The side frames 14A extend in the seat front-and-rear direction at left and right side portions of the seat cushion 12. The front frame 14B spans between upper portions of front portions of the left and right side frames 14A. The rear frame 14C and the rear frame 14D span between rear end portions of the left and right side frames 14A.

The left and right side frames 14A are formed in long, narrow shapes of, for example, metal plate, and are arranged with the length directions thereof in the vehicle front-and-rear direction and thickness directions thereof in the vehicle width direction. Rear end portions of the left and right side frames 14A each project to the seat upper side. The lower end portion 13A of the seat back 13 is connected to the projecting rear end portions. The side frames 14A are also connected to a floor portion of the vehicle body via a seat sliding mechanism, which is not shown in the drawings.

The front frame 14B is formed in a long, narrow shape of, for example, metal plate, and is arranged with the length direction thereof in the vehicle width direction. The front frame 14B is fixed to the front portions of the left and right side frames 14A by means such as welding or the like. The upper and lower rear frames 14C and 14D are formed of, for example, pipes fabricated of metal, and are arranged in attitudes in which axial directions thereof are in the vehicle width direction. Both vehicle width direction end portions of each of the rear frame 14C and the rear frame 14D are fixed to the rear end portions of the left and right side frames 14A by means such as crimping or the like.

The seat cushion springs 16 are disposed to be arrayed in the seat width direction between the left and right side frames 14A. The seat cushion springs 16 span between the front frame 14B and the lower side rear frame 14D. A seat cushion pad, which is not shown in the drawings, is supported by upper portions of the seat cushion springs 16. The seat cushion pad is constituted of, for example, a foam body of urethane foam or the like. A surface of the seat cushion pad is covered by a cover skin.

A movement suppression apparatus 20 is provided in the seat cushion 12. The movement suppression apparatus 20 is for suppressing movement of the seat occupant P toward the seat front during a collision of the vehicle. Details of the movement suppression apparatus 20 are described below.

—The Movement Suppression Apparatus—

As shown in FIG. 3, the movement suppression apparatus 20 is provided with cases 24 that are disposed at the seat upper side of the seat front side of the seat cushion 12 and are attached to the side frames 14A. In a seat side view, each case 24 is formed in a substantially rectangular shape whose longer direction is in the seat front-and-rear direction. A guide hole 24A is formed in a face at a seat width direction inner side of the case 24. The guide hole 24A is a long hole whose length direction is in the seat front-and-rear direction. The guide hole 24A is formed from a front end portion to a rear end portion of the case 24. A pelvis movement suppression member 22 is inserted into this guide hole 24A.

As shown in FIG. 2, the pelvis movement suppression member 22 is disposed at the seat upper side of the seat front side of the seat cushion 12 and is constituted by a pipe fabricated of metal that extends in the seat width direction. The pelvis movement suppression member 22 according to the present exemplary embodiment includes a linear portion 22A, which extends substantially linearly in the seat width direction, and side portions 22B, which protrude to the seat rear side from two end portions of the linear portion 22A. In FIG. 2, the side portion 22B at the seat left side is not shown, but has a shape with left-right symmetry with the side portion 22B at the seat right side. Therefore, in a plan view, the pelvis movement suppression member 22 as a whole is formed in a U shape that protrudes toward the seat front side.

Figure 4A:
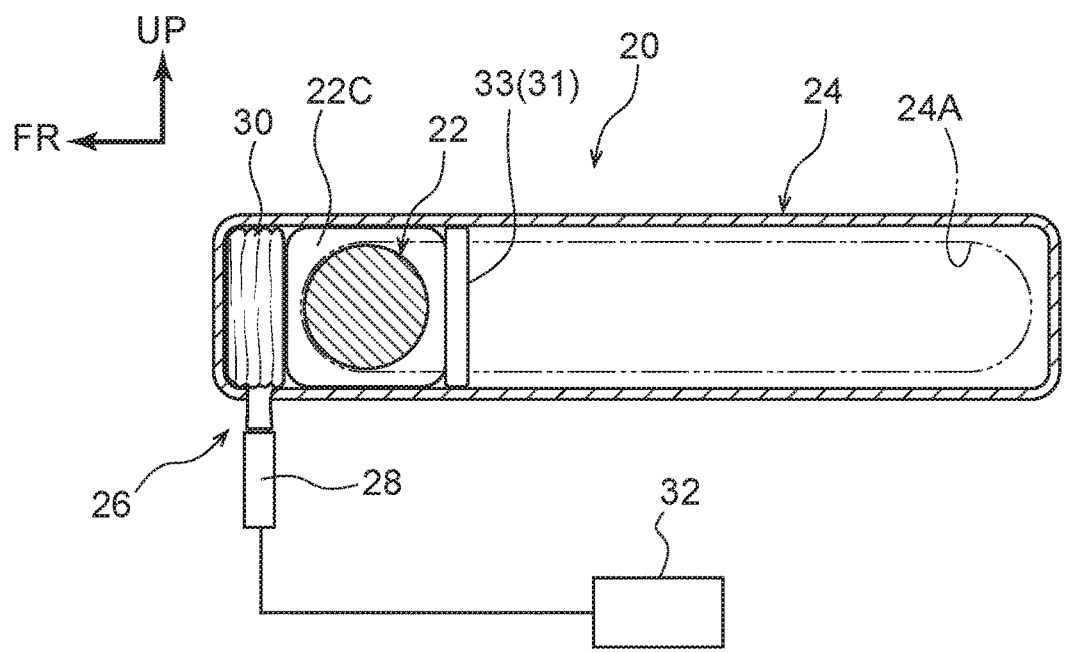
FIG. 4A is an enlarged side view showing a partial cutaway of a state prior to activation of a moving mechanism structuring the vehicle seat according to the first exemplary embodiment.

As shown in FIG. 4A, support portions 22C are provided at the two end portions of the pelvis movement suppression member 22. Each support portion 22C is formed substantially in a rectangular shape in a seat side view, and is disposed inside the corresponding case 24. The support portions 22C are supported to be movable in the seat front-and-rear direction relative to the side frames 14A (the seat cushion frame 14). Therefore, when the support portions 22C move in the seat front-and-rear direction, the pelvis movement suppression member 22 moves in the seat front-and-rear direction together with the support portions 22C. As illustrated by the two-dot chain lines in FIG. 2, in a usual state, the pelvis movement suppression member 22 is disposed at an initial position at the seat front side. As illustrated by the solid lines in FIG. 2, the pelvis movement suppression member 22 may be moved by a moving mechanism 26, which is described below, to a restraining position that is at the seat rear side relative to the initial position.

As shown in FIG. 4A, the movement suppression apparatus 20 is provided with the moving mechanism 26, which includes inflators 28 and bag bodies 30. Each inflator 28 according to the present exemplary embodiment is, for example, a cylinder-type inflator, which is caused to generate gas when activated. The inflator 28 is electronically connected to an electronic control unit (ECU) 32 that serves as a control section, which is described below. The inflator 28 is activated on the basis of signals from the ECU 32.

Figure 4B:
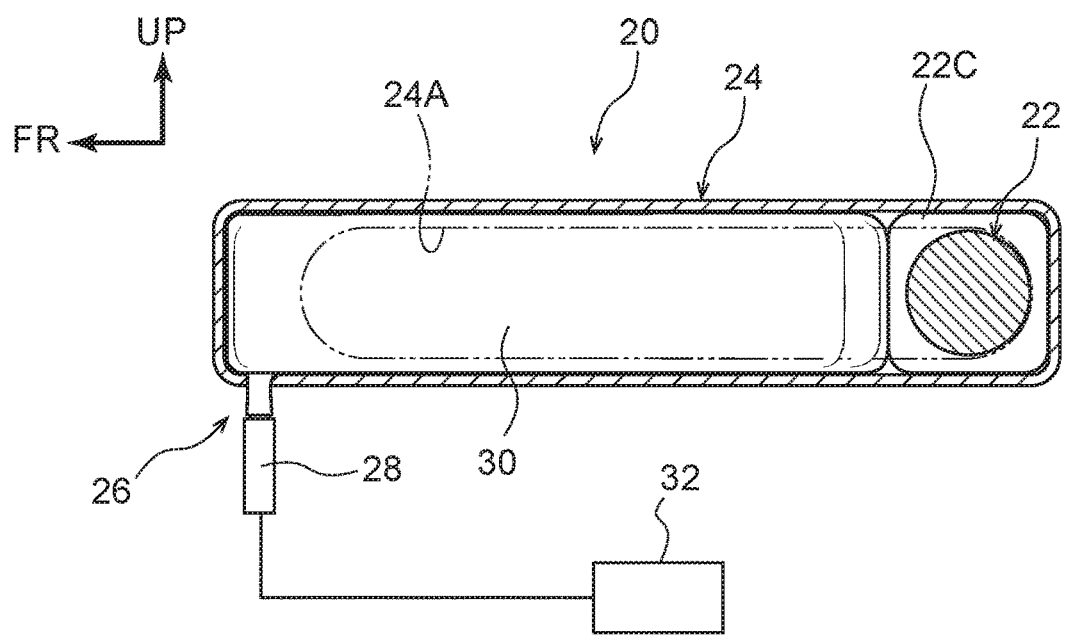
FIG. 4B is an enlarged side view showing a partial cutaway of a state in which the moving mechanism structuring the vehicle seat according to the first exemplary embodiment has activated.

Each bag body 30 is formed to be inflatable and compressible. In the usual state, the bag body 30 is disposed in a compressed state between the support portion 22C and an inner wall at the seat front side of the case 24. When the bag body 30 receives a supply of gas from the inflator 28, as shown in FIG. 4B, the bag body 30 inflates in the seat front-and-rear direction and moves the support portion 22C toward the seat rear side. Correspondingly, the pelvis movement suppression member 22 moves toward the seat rear side along the guide hole 24A, from the initial position to the restraining position.

In the state in which the pelvis movement suppression member 22 has moved to the restraining position, when a load acts on the pelvis movement suppression member 22 in the direction from the restraining position toward the initial position (toward the seat front side), the support portions 22C move toward the seat front side in opposition to internal pressure of the bag bodies 30. Thus, at least a portion of the load acting on the support portion 22C is absorbed. That is, in the present exemplary embodiment, an energy-absorbing mechanism is constituted by the inflators 28 and bag bodies 30 that form the moving mechanism 26. Accordingly, an energy absorption direction by the energy-absorbing mechanism is a substantially horizontal direction.

As shown in FIG. 4A, a stopper member 33 of a stopper mechanism 31 is provided at the seat rear side of each support portion 22C. The stopper member 33 is a plate-shaped member whose thickness direction is in the seat front-and-rear direction. The stopper member 33 abuts against an upper wall and a lower wall of the case 24. The support portion 22C of the pelvis movement suppression member 22 is anchored at the initial position by the stopper member 33. The stopper member 33 is structured to be movable in the seat width direction. The stopper member 33 moves in the seat width direction in response to signals from the ECU 32. Thus, the anchored state of the support portion 22C (and the pelvis movement suppression member 22) is unlocked.

A sensor that predicts a collision of the vehicle, a sensor that detects a collision of the vehicle, and suchlike are electronically connected to the ECU 32. As shown in FIG. 3, in the usual state prior to a collision of the vehicle being predicted or detected, the pelvis movement suppression member 22 is disposed at the initial position at the seat front side of each case 24. At the initial position, as seen in the seat front-and-rear direction, the pelvis movement suppression member 22 is disposed at a location that overlaps with ischial bones B of the seat occupant P.

When, on the basis of signals from the above-mentioned sensors, the ECU 32 predicts or detects a collision that would move the seat occupant P toward the seat front side, the ECU 32 moves each stopper member 33 in the seat width direction and releases the anchored state of the support portion 22C (and the pelvis movement suppression member 22). In addition, each inflator 28 activates in response to signals from the ECU 32 and the bag body 30 is inflated. As a result, as shown in FIG. 1, the pelvis movement suppression member 22 moves to the restraining position at the seat rear side.

—Operation—

Now, operation of the present exemplary embodiment is described.

In the vehicle seat 10 according to the present exemplary embodiment, the pelvis movement suppression member 22 is movable in the seat front-and-rear direction relative to the seat cushion frame 14 of the seat cushion 12. As shown in FIG. 4A and FIG. 4B, the pelvis movement suppression member 22 can be moved from the initial position at the seat front side to the restraining position at the seat rear side by the moving mechanism 26. When a collision that would move the seat occupant P toward the seat front side is predicted or detected, the moving mechanism 26 is activated by the ECU 32 and the pelvis movement suppression member 22 is moved toward the seat rear side. In association with the collision, the ischial bones B of the seat occupant P move toward the seat front side from a sitting position shown by two-dot chain lines in FIG. 1. As shown by the solid lines in FIG. 1, the movement of the ischial bones B of the seat occupant P toward the seat front side is suppressed by the pelvis movement suppression member 22 that has moved to the restraining position. Therefore, backward tilting of the pelvis may be suppressed without the thigh area (or buttock area) being pushed up, and the occurrence of submarining may be suppressed.

In the present exemplary embodiment, the energy-absorbing mechanism is structured by the inflators 28 and the bag bodies 30. That is, when a load in the direction from the restraining position toward the initial position acts on the pelvis movement suppression member 22 after the pelvis movement suppression member 22 has been moved by the moving mechanism 26, at least a portion of the load is absorbed by the inflated bag bodies 30. Therefore, in the state in which the pelvis movement suppression member 22 is being pushed in the direction toward the initial position by the pelvis area of the seat occupant P, at least a portion of the load from the pelvis area is absorbed, and a load against the seat occupant P may be moderated. In other words, during a collision, both submarining may be suppressed and a load against the seat occupant P may be moderated.

In particular in the present exemplary embodiment, the direction of energy absorption is a substantially horizontal direction. Therefore, a case of the pelvis area of the seat occupant P riding over the pelvis movement suppression member 22 may be suppressed compared to a structure in which the energy absorption direction is a front-downward direction (a direction steadily approaching the seat lower side toward the seat front side). That is, if the energy absorption direction was a front-downward direction, the pelvis movement suppression member 22 would move toward the seat lower side in association with the pelvis area of the seat occupant P moving toward the seat front side. As a result, the pelvis area of the seat occupant P might ride over the pelvis movement suppression member 22 and move toward the seat front side. In the present exemplary embodiment, by contrast, a case of the pelvis area of the seat occupant riding over the pelvis movement suppression member 22 may be suppressed as described above. Thus, a restrained state of the pelvis area of the seat occupant P may be excellently maintained.

As shown in FIG. 2, the pelvis movement suppression member 22 according to the present exemplary embodiment is formed as a whole in a U shape that protrudes toward the seat front side in plan view. Therefore, even if the seat occupant moves diagonally forward relative to the seat by inertia during a collision, the movement of the seat occupant may be suppressed by the pelvis movement suppression member 22.

In the present exemplary embodiment, as shown in FIG. 4A, the pelvis movement suppression member 22 is anchored at the initial position by the stopper members 33 of the stopper mechanism 31. Therefore, movement of the pelvis movement suppression member 22 from the initial position during usual driving may be suppressed.

In the present exemplary embodiment, the moving mechanism 26 moves the support portions 22C provided at the two end portions of the pelvis movement suppression member 22 towards the seat rear side. That is, the pelvis movement suppression member 22 is moved via the support portions 22C. Therefore, the moving mechanism 26 may be made smaller in size than in a structure in which a moving mechanism is disposed at a seat width direction central portion and directly moves the pelvis movement suppression member 22 in the seat front-and-rear direction. Thus, space may be saved.

In the present exemplary embodiment, the pelvis movement suppression member 22 at the initial position is disposed at a location that, seen in the seat front-and-rear direction, overlaps with the ischial bones of the seat occupant. Therefore, there is no need to move the pelvis movement suppression member 22 diagonally upward toward the seat rear side from the initial position when the ischial bones of the seat occupant P are to be braced; the pelvis movement suppression member 22 may be moved from the initial position to the restraining position in the substantially horizontal direction. Therefore, backward tilting of the pelvis may be suppressed without the thigh area (and buttock area) being pushed up. As a result, a case of the pelvis tilting backward and restraining force from a lap belt (seatbelt) decreasing may be suppressed.

In the present exemplary embodiment, as shown in FIG. 4A and FIG. 4B, the moving mechanism 26 includes the inflators 28 and the bag bodies 30, but this is not limiting. The structures of first to fourth variant examples illustrated in FIG. 5A to FIG. 9B may be employed.

First Variant Example of the First Exemplary Embodiment

Figure 5A:
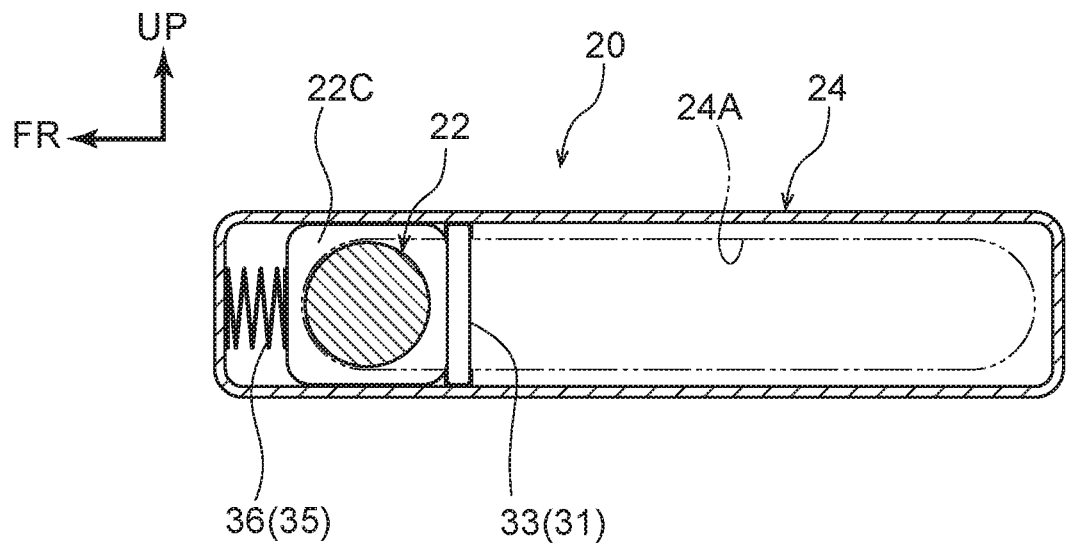
FIG. 5A is an enlarged side view showing a partial cutaway of a state prior to activation of a moving mechanism structuring a first variant example of the vehicle seat according to the first exemplary embodiment.

As shown in FIG. 5A, a moving mechanism 35 according to the first variant example includes a compression coil spring 36. The compression coil spring 36 is a spring that links the case 24 with the support portion 22C of the pelvis movement suppression member 22. One end portion of the compression coil spring 36 is attached to the inner wall at the seat front side of the case 24. The other end portion of the compression coil spring 36 is attached to the support portion 22C.

In the usual state, the support portion 22C is anchored at the initial position by the stopper member 33 of the stopper mechanism 31. In this state, the support portion 22C is pressed against the stopper member 33 by an urging force of the compression coil spring 36.

Figure 5B:
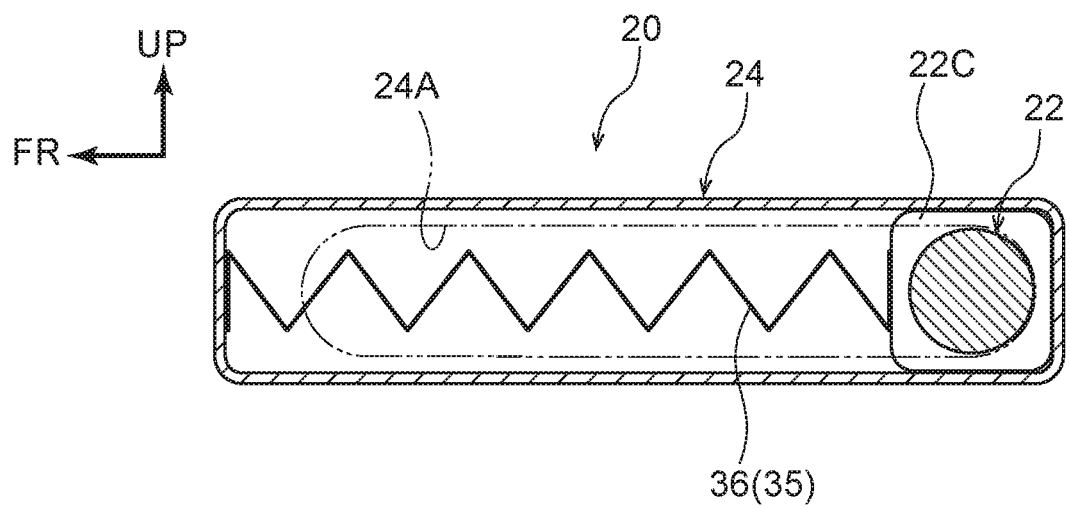
FIG. 5B is an enlarged side view showing a partial cutaway of a state in which the moving mechanism structuring the first variant example of the vehicle seat according to the first exemplary embodiment has activated.

From the state in FIG. 5A, when a collision that would move the seat occupant P toward the seat front side is detected or predicted, the stopper mechanism 31 activates and the stopper member 33 is moved in the seat width direction. Hence, the anchored state of the support portion 22C (the pelvis movement suppression member 22) is released and the support portion 22C is moved toward the seat rear side by the urging force of the compression coil spring 36. As a result, as shown in FIG. 5B, the pelvis movement suppression member 22 moves along the guide hole 24A toward the restraining position at the seat rear side.

In the state in which the pelvis movement suppression member 22 has moved to the restraining position, when a load acts on the pelvis movement suppression member 22 in the direction from the restraining position toward the initial position (toward the seat front side), the support portion 22C moves toward the initial position in opposition to the urging force of the compression coil spring 36. Therefore, at least a portion of the load is absorbed. That is, in the present variant embodiment, the energy-absorbing mechanism is constituted by the compression coil spring 36 that forms the moving mechanism 35. Moreover, the energy absorption direction according to this energy-absorbing mechanism is a substantially horizontal direction.

Second Variant Example of the First Exemplary Embodiment

Figure 6A:
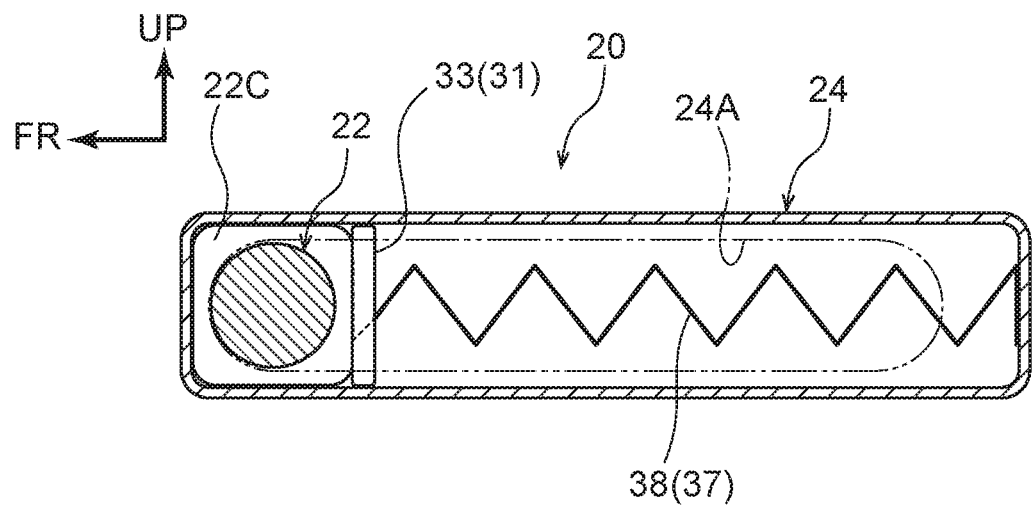
FIG. 6A is an enlarged side view showing a partial cutaway of a state prior to activation of a moving mechanism structuring a second variant example of the vehicle seat according to the first exemplary embodiment.

As shown in FIG. 6A, a moving mechanism 37 according to the second variant example includes an extension coil spring 38. The extension coil spring 38 is a spring that links the case 24 with the support portion 22C of the pelvis movement suppression member 22. One end portion of the extension coil spring 38 is attached to an inner wall at the seat rear side of the case 24. The other end portion of the extension coil spring 38 is passed through the stopper member 33 and attached to the support portion 22C.

In the usual state, the support portion 22C is anchored at the initial position by the stopper member 33 of the stopper mechanism 31. In this state, the support portion 22C is pressed against the stopper member 33 by a tensile force of the extension coil spring 38.

Figure 6B:
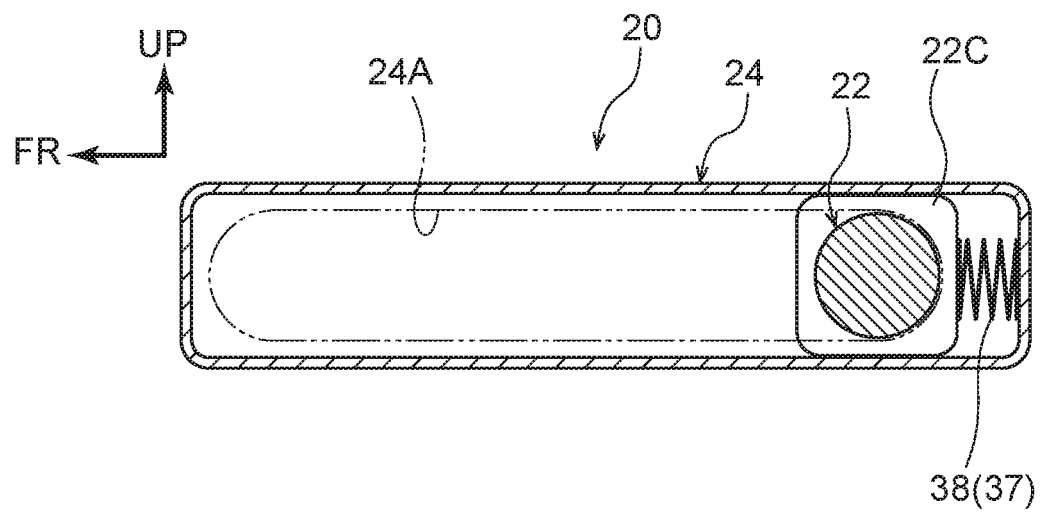
FIG. 6B is an enlarged side view showing a partial cutaway of a state in which the moving mechanism structuring the second variant example of the vehicle seat according to the first exemplary embodiment has activated.

When a collision that would move the seat occupant P toward the seat front side is detected or predicted, the stopper mechanism 31 activates, and the stopper member 33 is moved in the seat width direction. Hence, the anchored state of the support portion 22C (the pelvis movement suppression member 22) is released and the support portion 22C is moved toward the seat rear side by the tensile force of the extension coil spring 38. As a result, as shown in FIG. 6B, the pelvis movement suppression member 22 moves along the guide hole 24A toward the restraining position at the seat rear side.

In the state in which the pelvis movement suppression member 22 has moved to the restraining position, when a load acts on the pelvis movement suppression member 22 in the direction from the restraining position toward the initial position (toward the seat front side), the support portion 22C moves toward the initial position in opposition to the tensile force of the extension coil spring 38. Therefore, at least a portion of the load is absorbed. That is, in the present variant embodiment, the energy-absorbing mechanism is constituted by the extension coil spring 38 that forms the moving mechanism 37. Moreover, the energy absorption direction according to this energy-absorbing mechanism is a substantially horizontal direction.

Third Variant Example of the First Exemplary Embodiment

Figure 7A:
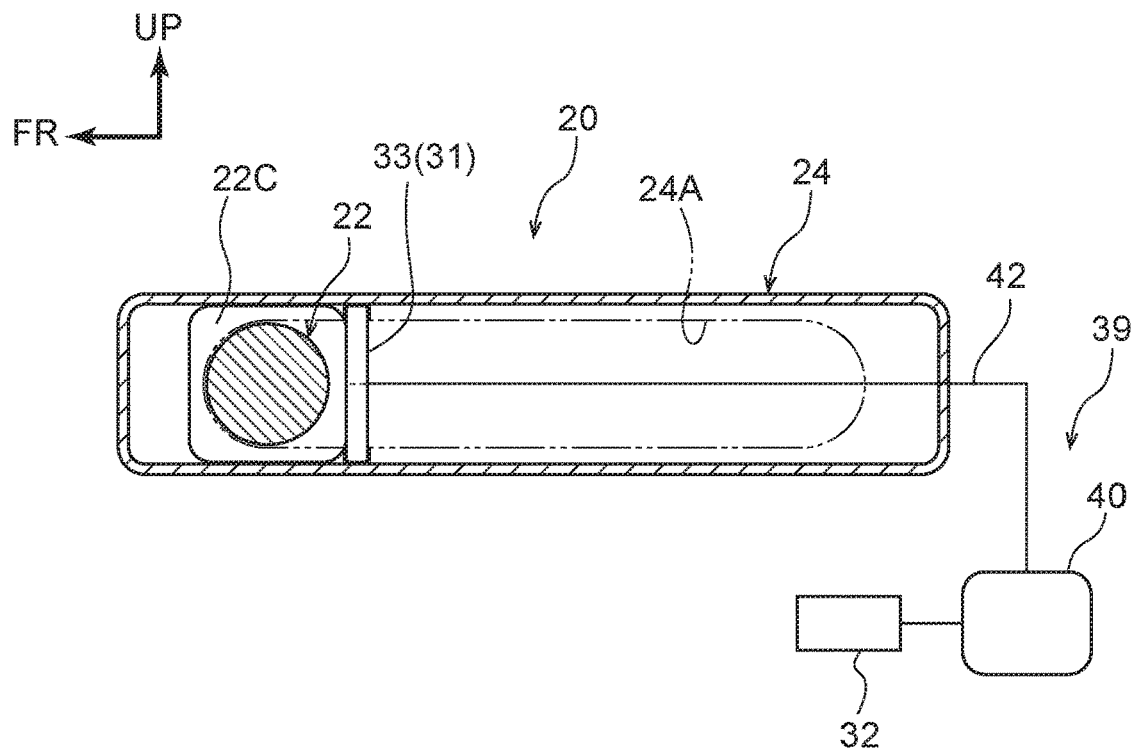
FIG. 7A is an enlarged side view showing a partial cutaway of a state prior to activation of a moving mechanism structuring a third variant example of the vehicle seat according to the first exemplary embodiment.
Figure 7B:
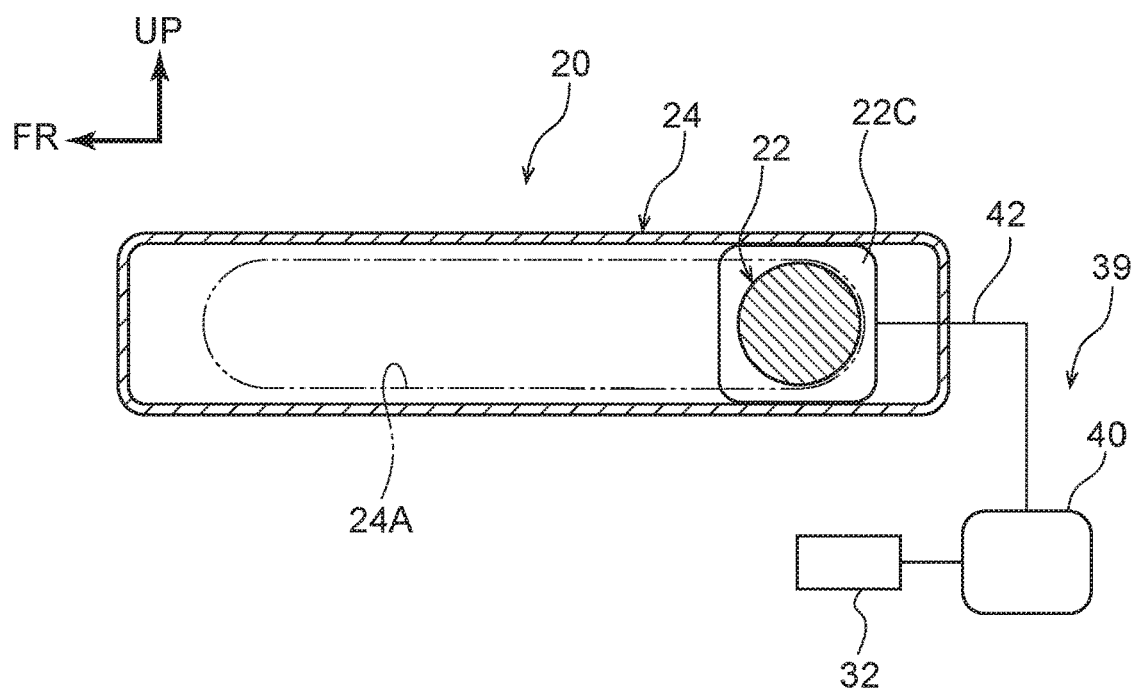
FIG. 7B is an enlarged side view showing a partial cutaway of a state in which the moving mechanism structuring the third variant example of the vehicle seat according to the first exemplary embodiment has activated.

As shown in FIG. 7A, a moving mechanism 39 according to the third variant example includes a pre-tensioner 40 and a wire 42. A spool, which is not shown in the drawings, is provided inside the pre-tensioner 40. The wire 42 is wound onto the spool, and the wire 42 can be pulled out from the pre-tensioner 40. The distal end side of the wire 42 is inserted into the case 24, passed through the stopper member 33 and attached to the support portion 22C. The pre-tensioner 40 according to the present variant embodiment is, for example, a structure in which the spool is rotated by a motor; the pre-tensioner 40 is electronically connected to the ECU 32.

In the usual state, the support portion 22C is anchored at the initial position by the stopper member 33 of the stopper mechanism 31. When a collision that would move the seat occupant P toward the seat front side is detected or predicted, the stopper member 33 is moved in the seat width direction in response to signals from the ECU 32, releasing the anchored state of the support portion 22C (and the pelvis movement suppression member 22). The pre-tensioner 40 also activates in response to signals from the ECU 32, instantaneously taking up the wire 42. Thus, the support portion 22C (the pelvis movement suppression member 22) is moved to the restraining position at the seat rear side.

In the state in which the pelvis movement suppression member 22 has moved to the restraining position, when a load acts on the pelvis movement suppression member 22 in the direction from the restraining position toward the initial position (toward the seat front side), the support portion 22C moves toward the initial position in opposition to force from the motor of the pre-tensioner 40. Therefore, at least a portion of the load is absorbed. That is, in the present variant embodiment, the energy-absorbing mechanism is constituted by the pre-tensioner 40 that forms the moving mechanism 39. Moreover, the energy absorption direction according to this energy-absorbing mechanism is a substantially horizontal direction.

Fourth Variant Example of the First Exemplary Embodiment

Figure 8A:
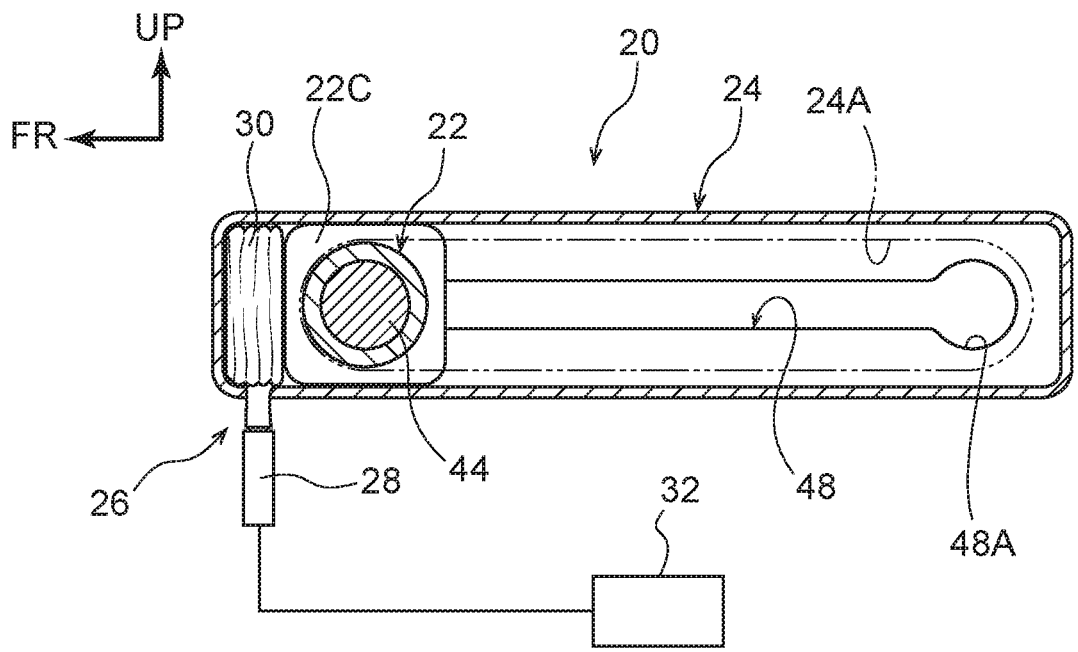
FIG. 8A is an enlarged side view showing a partial cutaway of a state prior to activation of a moving mechanism structuring a fourth variant example of the vehicle seat according to the first exemplary embodiment.
Figure 8B:
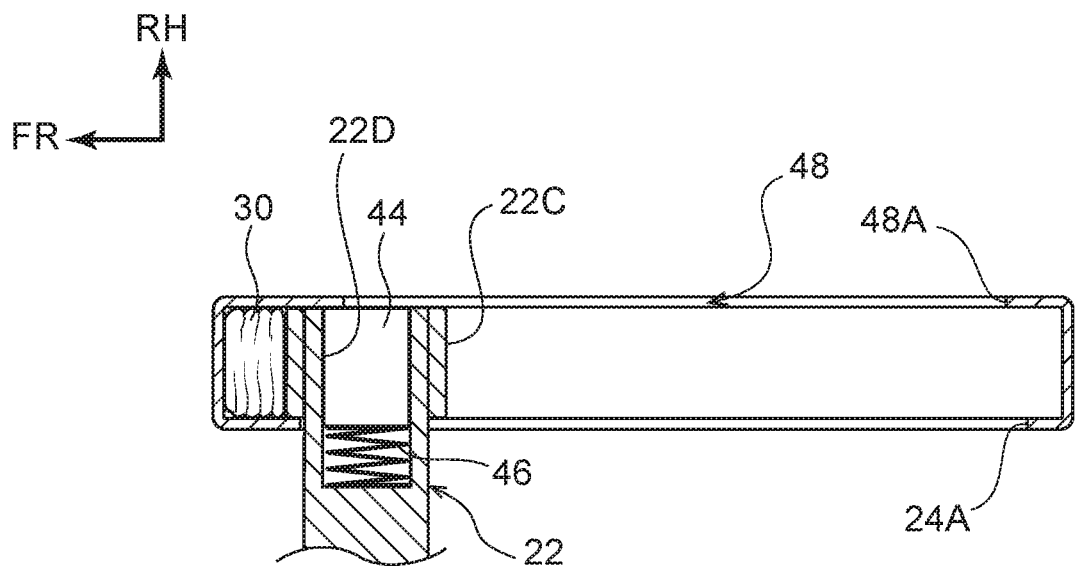
FIG. 8B is an enlarged plan view showing a partial cutaway of the state prior to activation of the moving mechanism structuring the fourth variant example of the vehicle seat according to the first exemplary embodiment.

As shown in FIG. 8A and FIG. 8B, the moving mechanism 26 according to the fourth variant example includes the inflator 28 and the bag body 30. The inflator 28 is electronically connected to the ECU 32.

Figure 9A:
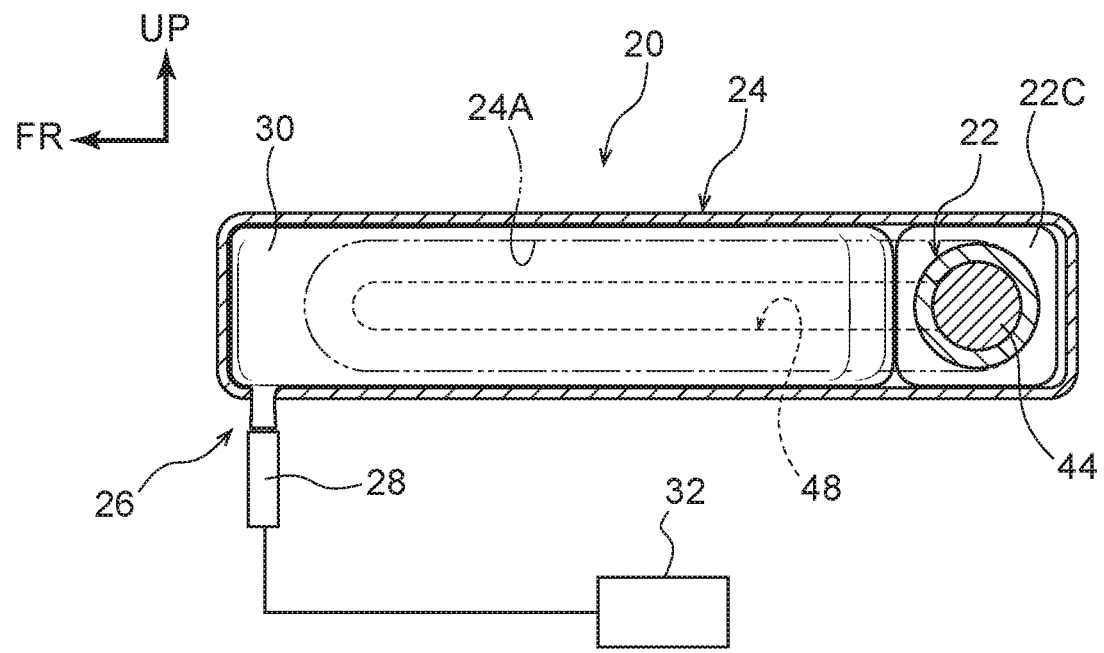
FIG. 9A is an enlarged side view showing a partial cutaway of a state in which the moving mechanism structuring the fourth variant example of the vehicle seat according to the first exemplary embodiment has activated.
Figure 9B:
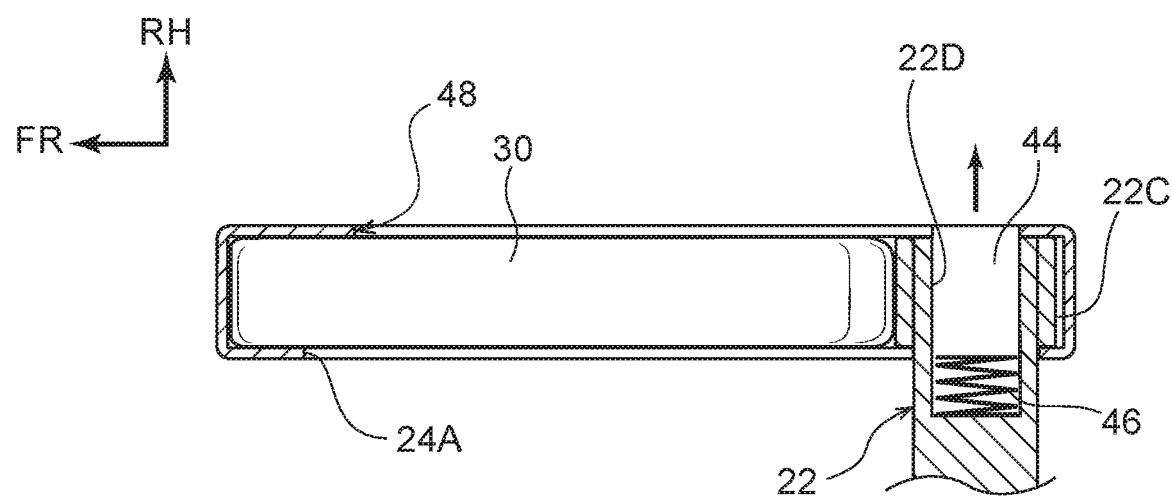
FIG. 9B is an enlarged plan view showing a partial cutaway of a state in which the moving mechanism structuring the fourth variant example of the vehicle seat according to the first exemplary embodiment has activated.

The bag body 30 is formed to be inflatable and compressible. In the usual state, the bag body 30 is disposed in the compressed state between the support portion 22C and the inner wall at the seat front side of the case 24. When the bag body 30 receives a supply of gas from the inflator 28, as shown in FIG. 9A and FIG. 9B, the bag body 30 inflates in the seat front-and-rear direction and moves the support portion 22C toward the seat rear side. Correspondingly, the pelvis movement suppression member 22 moves toward the seat rear side along the guide hole 24A, from the initial position to the restraining position.

In the present variant example, as shown in FIG. 8B, an accommodation portion 22D is formed in a distal end portion of the pelvis movement suppression member 22, and a circular rod-shaped pin 44 is accommodated in the accommodation portion 22D. The accommodation portion 22D is formed in a seat width direction end face of the pelvis movement suppression member 22. Therefore, an end portion at the seat width direction outer side of the accommodation portion 22D is open. One end portion of a compression coil spring 46 is attached to a floor portion of the accommodation portion 22D.

The pin 44 is formed with a size that corresponds with the accommodation portion 22D. The other end portion of the compression coil spring 46 is attached to an end face at the seat width direction inner side of the pin 44. Thus, the pin 44 is linked to the pelvis movement suppression member 22 by the compression coil spring 46, and the pin 44 is pushed against the inner wall at the seat width direction outer side of the case 24 by an urging force of the compression coil spring 46. In this state, an end face of the pin 44 substantially coincides with the end face of the pelvis movement suppression member 22.

A groove portion 48 is formed in the inner wall at the seat width direction outer side of the case 24. In the present variant example, the energy-absorbing mechanism includes the groove portion 48 and the pin 44. As shown in FIG. 8A, the groove portion 48 is formed with a length direction in the seat front-and-rear direction, from a front end portion to a rear end portion of the case 24. The groove portion 48 is formed with a constant groove width apart from a rear end portion thereof. The rear end portion of the groove portion 48 is formed as a circular hole portion 48A with a substantially circular shape in a seat side view. The circular hole portion 48A has a wider groove width than the main portion of the groove portion 48 and is formed with a size into which the pin 44 can be inserted.

In the structure of the present variant example, when a collision that would move the seat occupant P toward the seat front side is detected or predicted, the inflator 28 activates in response to signals from the ECU 32. As a result, as shown in FIG. 9A, the bag body 30 inflates, the support portion 22C is moved toward the seat rear side, and the pelvis movement suppression member 22 is moved along the guide hole 24A toward the restraining position. At this time, the pin 44 moves toward the seat rear side together with the pelvis movement suppression member 22, while being pressed against the inner wall of the case 24 by the compression coil spring 46. As shown in FIG. 9B, the pin 44 moves to the circular hole portion 48A at the restraining position and is inserted into the circular hole portion 48A.

In the state in which the pelvis movement suppression member 22 has moved to the restraining position, when a load acts on the pelvis movement suppression member 22 in the direction from the restraining position toward the initial position (toward the seat front side), the pin 44 moves toward the initial position while pushing apart the walls of the groove portion 48. Therefore, at least a portion of the load is absorbed. Thus, the energy absorption direction according to this energy-absorbing mechanism is a substantially horizontal direction.

Second Exemplary Embodiment

Now, a second exemplary embodiment is described with reference to FIG. 10 to FIG. 16. Structures and operations that are basically the same as in the first exemplary embodiment are assigned the same reference symbols as in the first exemplary embodiment and are not described.

Figure 10:
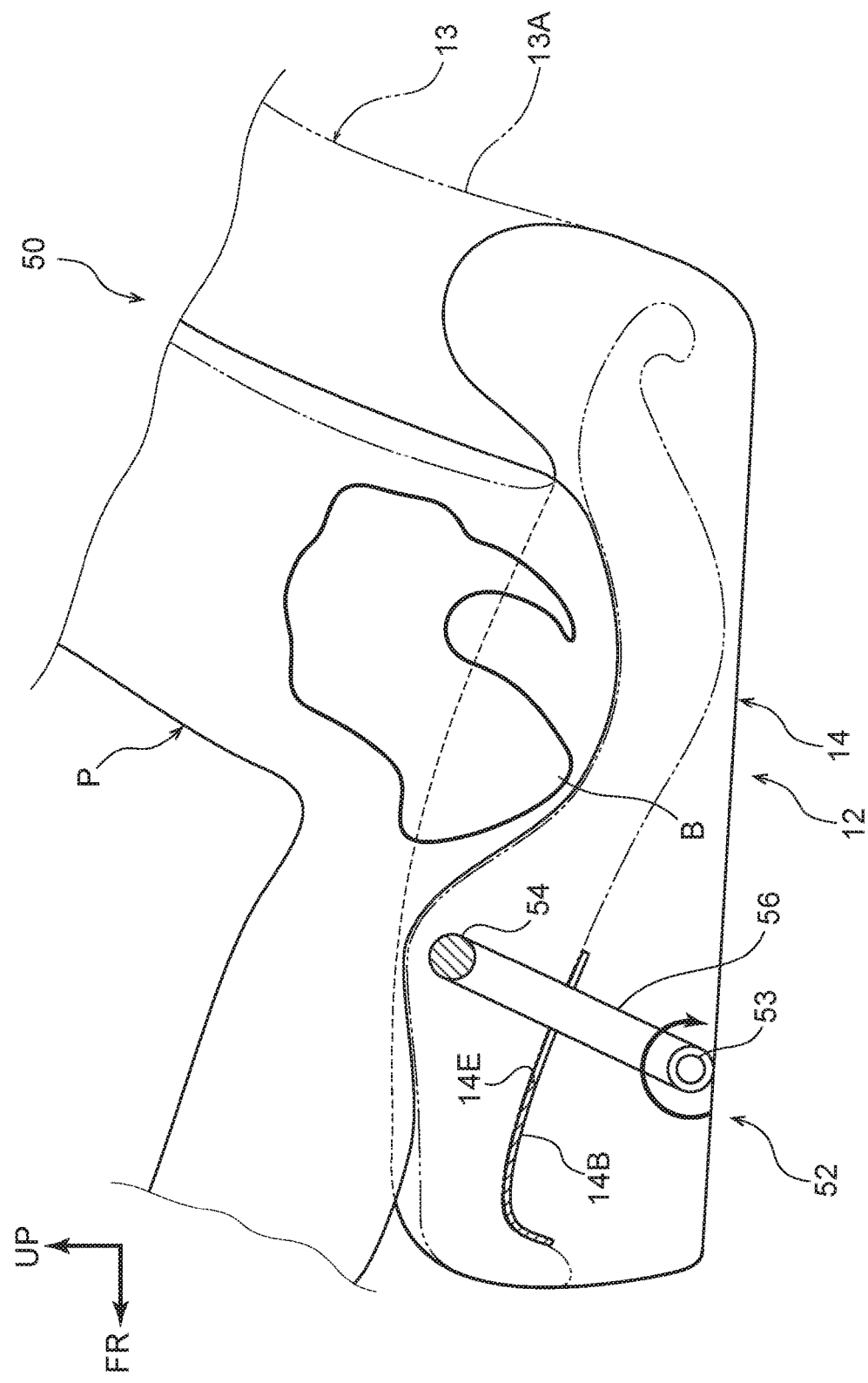
FIG. 10 is an enlarged side view showing a seat cushion structuring a vehicle seat according to a second exemplary embodiment, which is a view showing a state in which a pelvis movement suppression member has moved to a restraining position.
Figure 11:
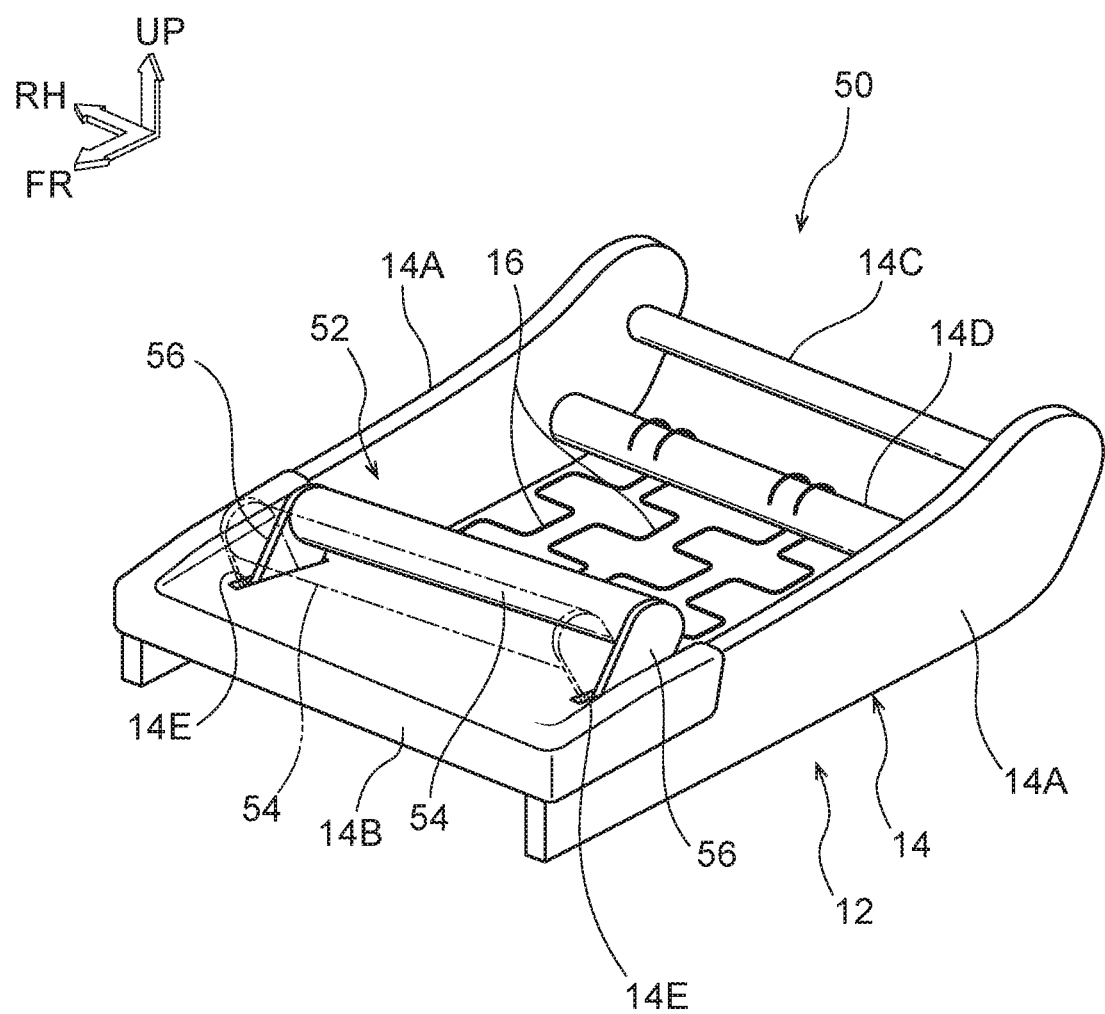
FIG. 11 is a perspective view showing the seat cushion structuring the vehicle seat according to the second exemplary embodiment.

As shown in FIG. 10 and FIG. 11, a vehicle seat 50 according to the present exemplary embodiment includes the seat cushion 12 and the seat back 13, similarly to the first exemplary embodiment. The seat cushion 12 includes the seat cushion frame 14 that is the framework member and the plural seat cushion springs 16 that are attached to the seat cushion frame 14. In the present exemplary embodiment, S-springs are employed as the seat cushion springs 16, but the shapes thereof may be the same as in the first exemplary embodiment.

The front frame 14B according to the present embodiment is formed in a long, narrow shape of, for example, metal plate, and is arranged with the length direction thereof in the vehicle width direction. The front frame 14B spans between upper end portions of the left and right side frames 14A. Incision portions 14E are formed at both of left and right end portions of a rear end portion of the front frame 14B. Support portions 56, which are described below, are inserted into the incision portions 14E.

A movement suppression apparatus 52 is provided in the seat cushion 12. The movement suppression apparatus 52 is for suppressing movement of the seat occupant P toward the seat front during a collision of the vehicle. Details of the movement suppression apparatus 52 are described below.

—The Movement Suppression Apparatus—

As shown in FIG. 10, the movement suppression apparatus 52 is provided with rotary shafts 53 that are disposed at the seat front side of the seat cushion 12 and are attached to the side frames 14A. Each rotary shaft 53 is disposed at a lower end portion of the corresponding side frame 14A and extends in the seat width direction. A lower end portion of the corresponding support portion 56 is swingably attached to the rotary shaft 53.

The support portion 56 is formed in a long, narrow plate shape, with a lower end portion of the support portion 56 attached to the rotary shaft 53. An upper end portion of the support portion 56 extends toward the seat upper side through the incision portion 14E of the front frame 14B. A pelvis movement suppression member 54 is attached to the upper end portions of the support portions 56.

As shown in FIG. 11, the pelvis movement suppression member 54 is disposed at the seat upper side of the seat front side of the seat cushion 12 and is constituted by a pipe fabricated of metal that extends in the seat width direction. The pelvis movement suppression member 54 according to the present exemplary embodiment extends substantially linearly in the seat width direction. The pelvis movement suppression member 54 is movable in the seat front-and-rear direction relative to the seat cushion frame 14 by swinging of the support portions 56, between an initial position at the seat front side (see the two-dot chain lines) and a restraining position at the seat rear side (see the solid lines in FIG. 11).

Figure 12:
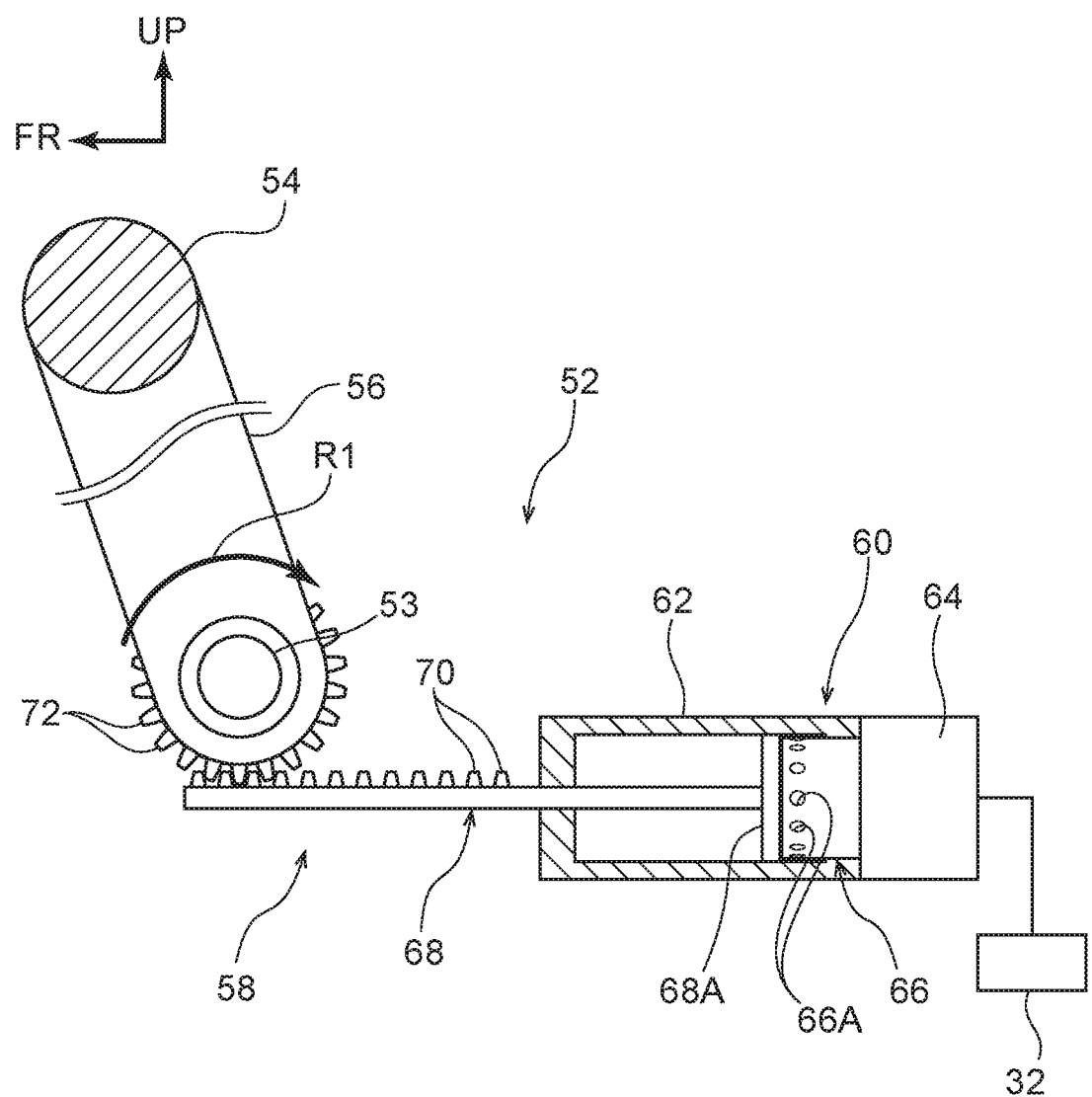
FIG. 12 is an enlarged side view showing a partial cutaway of a moving mechanism structuring the vehicle seat according to the second exemplary embodiment, which is a view showing a state prior to activation of the moving mechanism.

As shown in FIG. 12, the movement suppression apparatus 52 is provided with moving mechanisms 58. Each moving mechanism 58 includes an inflator 60, a rack gear 70 and a pinion gear 72.

The inflator 60 is provided with a case 62 with a substantially cylindrical shape whose length direction is in the seat front-and-rear direction in a seat side view. An ignition portion 64 is provided at a rear end portion of the case 62. A jetting-out portion 66 is provided adjacent to the ignition portion 64 in the case 62. Plural gas jetting-out holes 66A are formed in a periphery of the jetting-out portion 66. Thus, at a time of activation of the inflator 60, the ignition portion is ignited and gas is jetted out through the gas jetting-out holes 66A.

A rear end portion of a rod 68 is inserted inside the case 62. The rod 68 extends in the seat front-and-rear direction. A sliding portion 68A is provided at the rear end portion of the rod 68. The sliding portion 68A abuts against inner walls of the case 62 and is slidable in the seat front-and-rear direction inside the case 62.

The rack gear 70 is provided at the front end side of the rod 68. The rack gear 70 is provided at the rod 68 outside the case 62, and the pinion gear 72 meshes with the rack gear 70.

The pinion gear 72 is provided at the lower end portion of the support portion 56. In accordance with movement of the rack gear 70 to the seat front side, the support portion 56 swings around the rotary shaft 53, in the direction of arrow R1 in FIG. 12.

The ignition portion 64 of each inflator 60 is electronically connected to the ECU 32. The ignition portion 64 ignites in response to signals from the ECU 32. In other words, the inflator 60 activates in response to signals from the ECU 32.

A sensor that predicts a collision of the vehicle, a sensor that detects a collision of the vehicle, and suchlike are electronically connected to the ECU 32. In the usual state prior to a collision of the vehicle being predicted or detected, each support portion 56 is in a forward-tilted state and the pelvis movement suppression member 54 is disposed at the initial position at the seat front side. In the usual state, because the rack gear 70 and pinion gear 72 are meshed, swinging of the support portion 56 is suppressed. That is, a stopper mechanism that anchors the pelvis movement suppression member 54 at the initial position is constituted by the rack gears 70 and pinion gears 72. At the initial position, as seen in the seat front-and-rear direction, the pelvis movement suppression member 54 is disposed at a location that overlaps with the ischial bones B of the seat occupant P (see FIG. 10).

Figure 13:
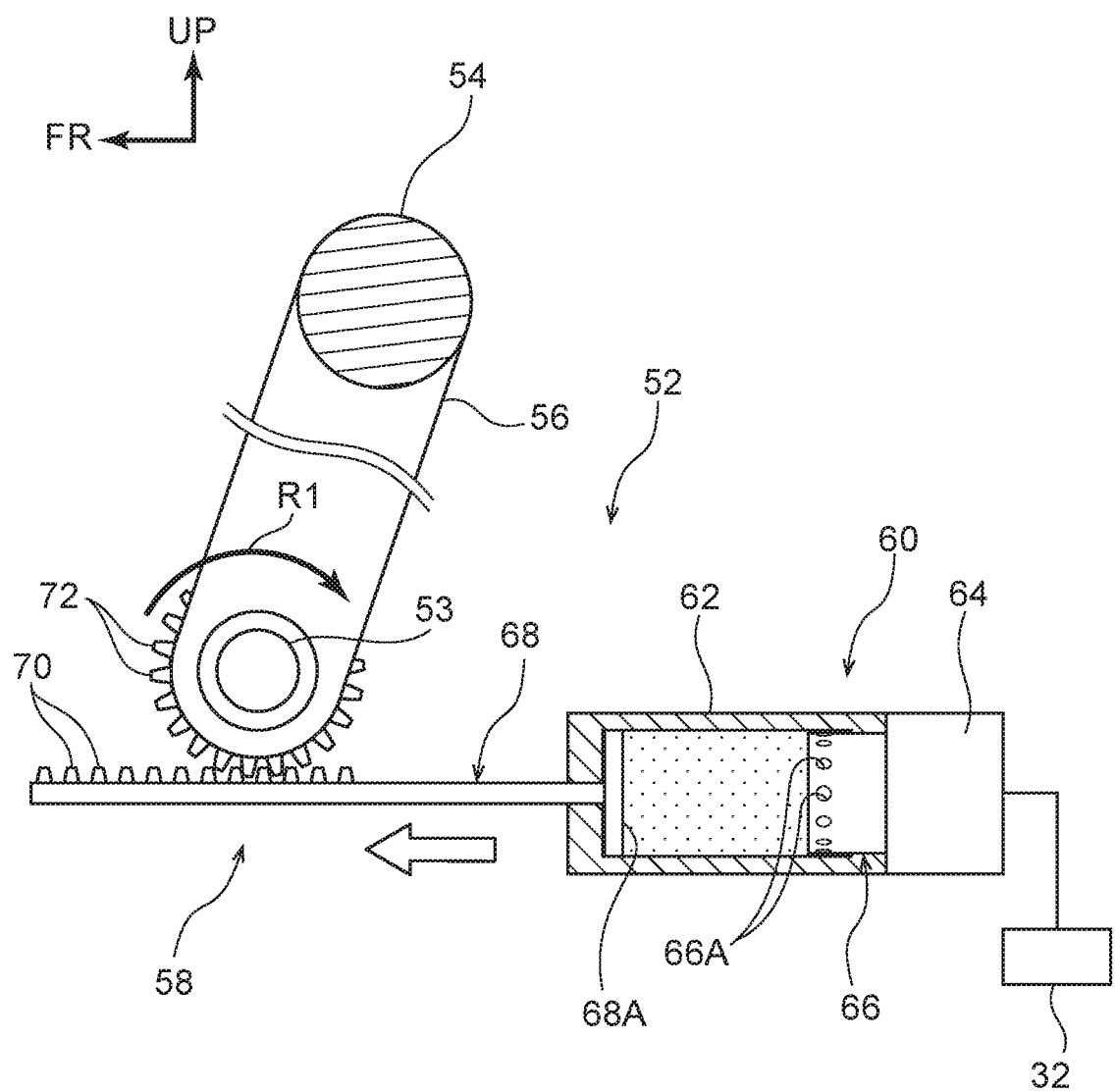
FIG. 13 is an enlarged side view showing a partial cutaway of the moving mechanism structuring the vehicle seat according to the second exemplary embodiment, which is a view showing a state in which the moving mechanism has been activated.

When the ECU 32 detects or predicts a collision on the basis of signals from the above-mentioned sensors, the ECU 32 activates each inflator 60 and gas is jetted out through the gas jetting-out holes 66A into the case 62. Hence, as shown in FIG. 13, the rod 68 moves toward the seat front side in association with the sliding portion 68A sliding toward the seat front side and, because of the meshing of the rack gear 70 with the pinion gear 72, the support portion 56 swings in the direction of arrow R1. As a result, the pelvis movement suppression member 54 moves to the restraining position at the seat rear side. In the present exemplary embodiment, a swinging angle of the pelvis movement suppression member 54 is adjusted such that a height of the pelvis movement suppression member 54 at the restraining position is unchanged from a height of the pelvis movement suppression member 54 at the initial position, but this is not limiting.

In the state in which the pelvis movement suppression member 54 has moved to the restraining position, when a load acts on the pelvis movement suppression member 54 in the direction from the restraining position toward the initial position (toward the seat front side), because of the meshing between the rack gears 70 and the pinion gears 72, the load acts toward the seat rear side on the rods 68. Hence, the sliding portions 68A move towards the seat rear side in opposition to internal pressure of the cases 62. Thus, at least a portion of the load is absorbed. Therefore, an energy absorption direction according to this energy-absorbing mechanism is a substantially horizontal direction.

—Operation—

Now, operation of the present exemplary embodiment is described.

In the vehicle seat 50 according to the present exemplary embodiment, because the pelvis movement suppression member 54 moves to the restraining position when a collision of the vehicle is detected or predicted, movement of the ischial bones B of the seat occupant P toward the seat front side may be suppressed and submarining may be suppressed. Subsequent to this movement, when a load acts on the pelvis movement suppression member 54 in the direction from the restraining position toward the initial position, at least a portion of the load may be absorbed. In other words, during a collision, both submarining may be suppressed and a load against the seat occupant P may be moderated.

In addition in the present exemplary embodiment, because the pelvis movement suppression member 54 is moved to the restraining position by swinging of the support portions 56, the pelvis movement suppression member 54 may be moved by a simpler structure than a structure in which a pelvis movement suppression apparatus slides as in the first exemplary embodiment. Other operations are similar to the first exemplary embodiment.

In the present exemplary embodiment, at least a portion of a load is absorbed by each sliding portion 68A moving toward the seat rear side in opposition to the internal pressure of the case 62. Instead of or in addition to this structure, an energy-absorbing mechanism 73 shown in FIG. 14A and FIG. 14B may be employed.

Figure 14A:
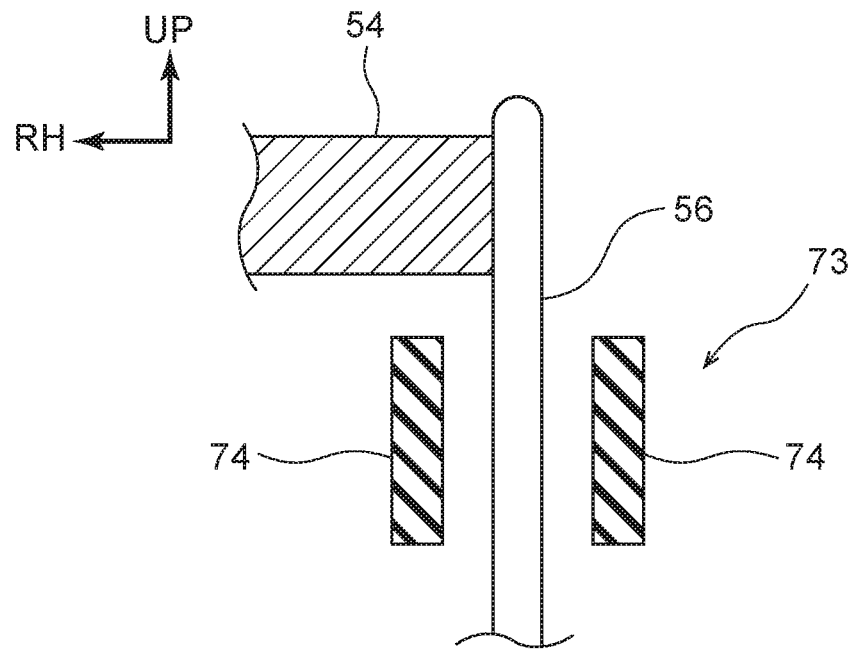
FIG. 14A is a front view showing an enlargement of a state prior to activation of an energy-absorbing mechanism structuring the vehicle seat according to the second exemplary embodiment.
Figure 14B:
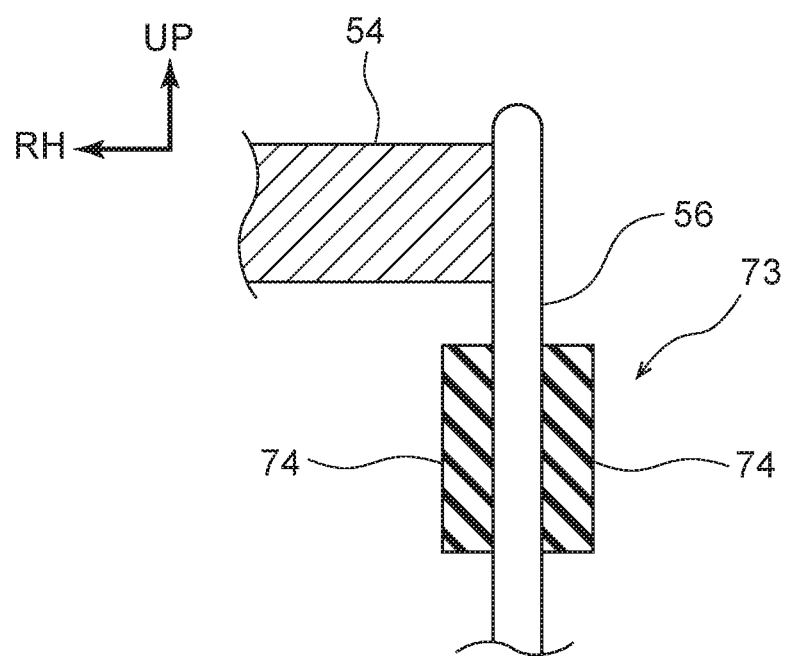
FIG. 14B is a front view showing an enlargement of a state in which the energy-absorbing mechanism structuring the vehicle seat according to the second exemplary embodiment has activated.

As shown in FIG. 14A, the energy-absorbing mechanism 73 includes a left and right pair of pressure members 74. The pressure members 74 are supported by a support mechanism, which is not shown in the drawings. The pressure members 74 are provided at both the left and right sides of the support portion 56 and are configured to be movable in directions towards one another in response to signals from the ECU 32. For example, in the state in which the support portion 56 is disposed at the restraining position, the pressure members 74 move in directions to approach one another in response to signals from the ECU 32. Thus, the pressure members 74 nip the support portion 56 from both the left and right sides as shown in FIG. 14B.

Because the support portion 56 is nipped by the pair of pressure members 74 as described above, when a load acts on the support portion 56 in the direction from the restraining position toward the initial position, at least a portion of the load may be absorbed by friction between the pressure members 74 and the support portion 56.

Figure 15:
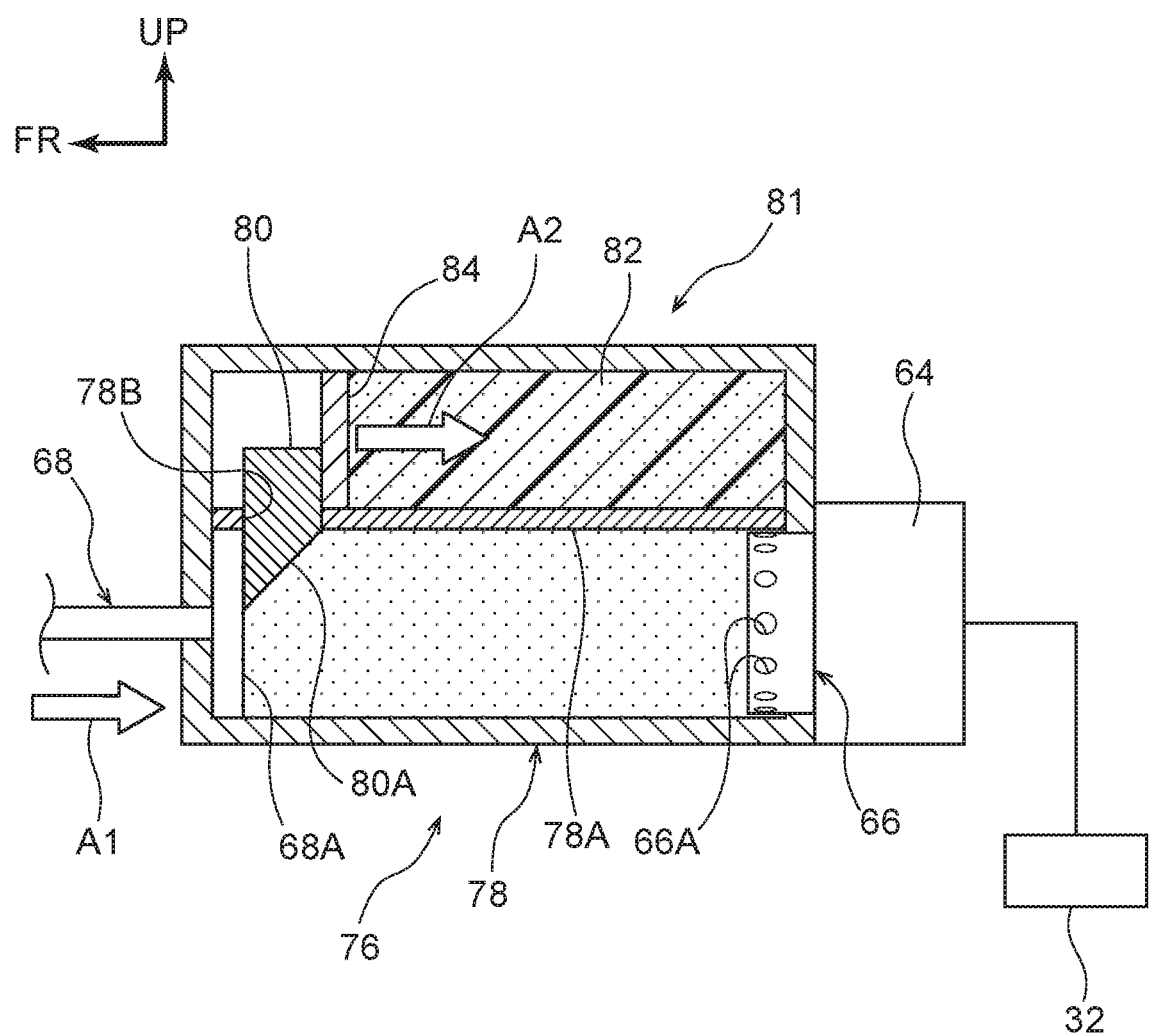
FIG. 15 is an enlarged side view showing a partial cutaway of a variant example of the energy-absorbing mechanism structuring the vehicle seat according to the second exemplary embodiment.

Further still, an inflator 76 equipped with an energy-absorbing mechanism 81 as shown in FIG. 15 may be employed instead of the inflator 60 in FIG. 12.

As shown in FIG. 15, the inflator 76 is provided with a case 78 with a substantially rectangular shape in seat side view. The ignition portion 64 is provided at a rear end portion of the case 78, and the jetting-out portion 66 is provided in the case 78 adjacent to the ignition portion 64. The plural gas jetting-out holes 66A are formed in the periphery of the jetting-out portion 66.

The case 78 has an upper and lower two-level structure. The case 78 is divided into the upper and lower levels by a partition wall 78A with a lower strength than an outer shell of the case 78. The jetting-out portion 66 is disposed in the lower level of the case 78. A foam material 82 constituting the energy-absorbing mechanism 81 is charged into the upper level of the case 78. The foam material 82 is charged inside the case 78 from a rear portion of the upper level to some way to the seat front side relative to a seat front-and-rear direction central portion. The space inside which the foam material 82 is charged is closed off by a plate-shaped lid 84. The energy-absorbing mechanism 81 includes the foam material 82 and the lid 84.

A penetrating hole 78B is formed in the partition wall 78A of the case 78. A pin 80 is inserted through the penetrating hole 78B. A lower half of the pin 80 is disposed at the lower side relative to the partition wall 78A and an upper half of the pin 80 is disposed at the upper side relative to the partition wall 78A. A rear face at the lower side of the pin 80 is formed as an angled face 80A, which is angled to steadily taper to a point toward the seat lower side. The pin 80 is provided to be movable in the up-and-down direction; the position of the pin 80 in FIG. 15 is maintained by a suspension member which is not shown in the drawings, such as a spring or the like.

Because the inflator 76 is structured as described above, when a collision of the vehicle is detected or predicted, gas is jetted out into the case 78 through the gas jetting-out holes 66A of the jetting-out portion 66, and the sliding portion 68A (the rod 68) moves toward the seat front side. In this structure, the sliding portion 68A of the rod 68 abuts against the angled face 80A of the pin 80, the pin 80 is lifted up toward the seat upper side, and the sliding portion 68A can move to the seat front side of the pin 80. The sliding portion 68A passes under the pin 80, and the pin 80 moves downward into the state in FIG. 15.

Then, when a load is received from the seat occupant and the rod 68 moves toward the seat rear side (the direction of arrow A1 in FIG. 15), the sliding portion 68A abuts against the front face of the pin 80 and moves the pin 80 toward the seat rear side. Accordingly, the partition wall 78A with low strength is broken and the pin 80 moves toward the seat rear side. Consequently, the lid 84 is pushed by the pin 80 and crushes the foam material 82 while moving toward the seat rear side, absorbing at least a portion of the load.

According to the structure described above, an absorption efficiency of the energy-absorbing mechanism may be easily adjusted by altering the material and the like of the foam material 82.

As shown in FIG. 12, in the present exemplary embodiment the moving mechanism 58 includes the inflator 60, the rack gear 70 and the pinion gear 72, but this is not limiting. For example, the structure of a variant example illustrated in FIG. 16 may be employed.

Variant Example of the Second Exemplary Embodiment

Figure 16:
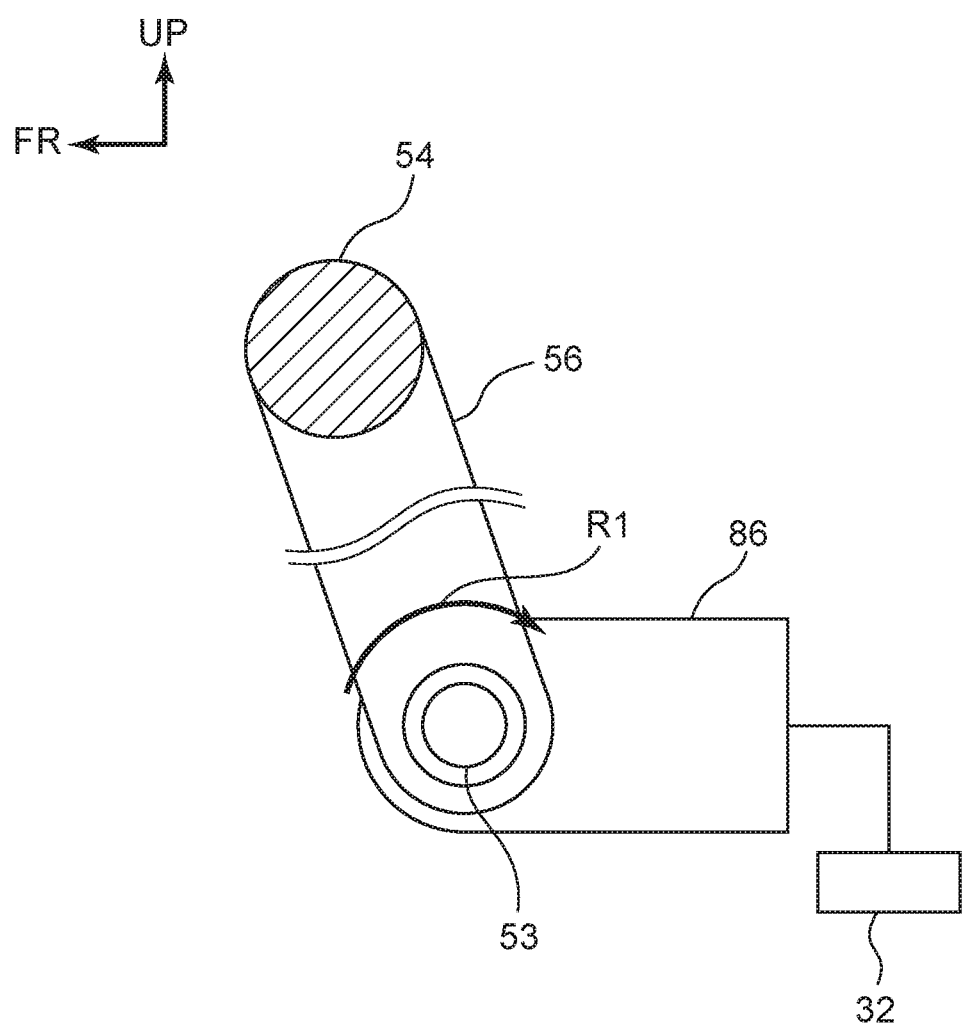
FIG. 16 is an enlarged side view showing a partial cutaway of a variant example of the moving mechanism structuring the vehicle seat according to the second exemplary embodiment, which is a view showing a state prior to activation of the moving mechanism.

As shown in FIG. 16, in the present variant example, a motor 86 is provided instead of the inflator 60. The rotary shaft 53 is formed as an output shaft of the motor 86, and the lower end portion of the support portion 56 is swingably attached to the rotary shaft 53.

In the structure described above, swinging of the support portion 56 is suppressed by the motor 86 being electrified. That is, the motor 86 functions as a stopper mechanism. In addition, the motor 86 drives in response to signals from the ECU 32 and swings the support portion 56 in the direction of arrow R1 in FIG. 16, toward the restraining position at the seat rear side.

Third Exemplary Embodiment

Now, a third exemplary embodiment is described with reference to FIG. 17 and FIG. 18. Structures and operations that are basically the same as in the first exemplary embodiment are assigned the same reference symbols as in the first exemplary embodiment and are not described.

Figure 17:
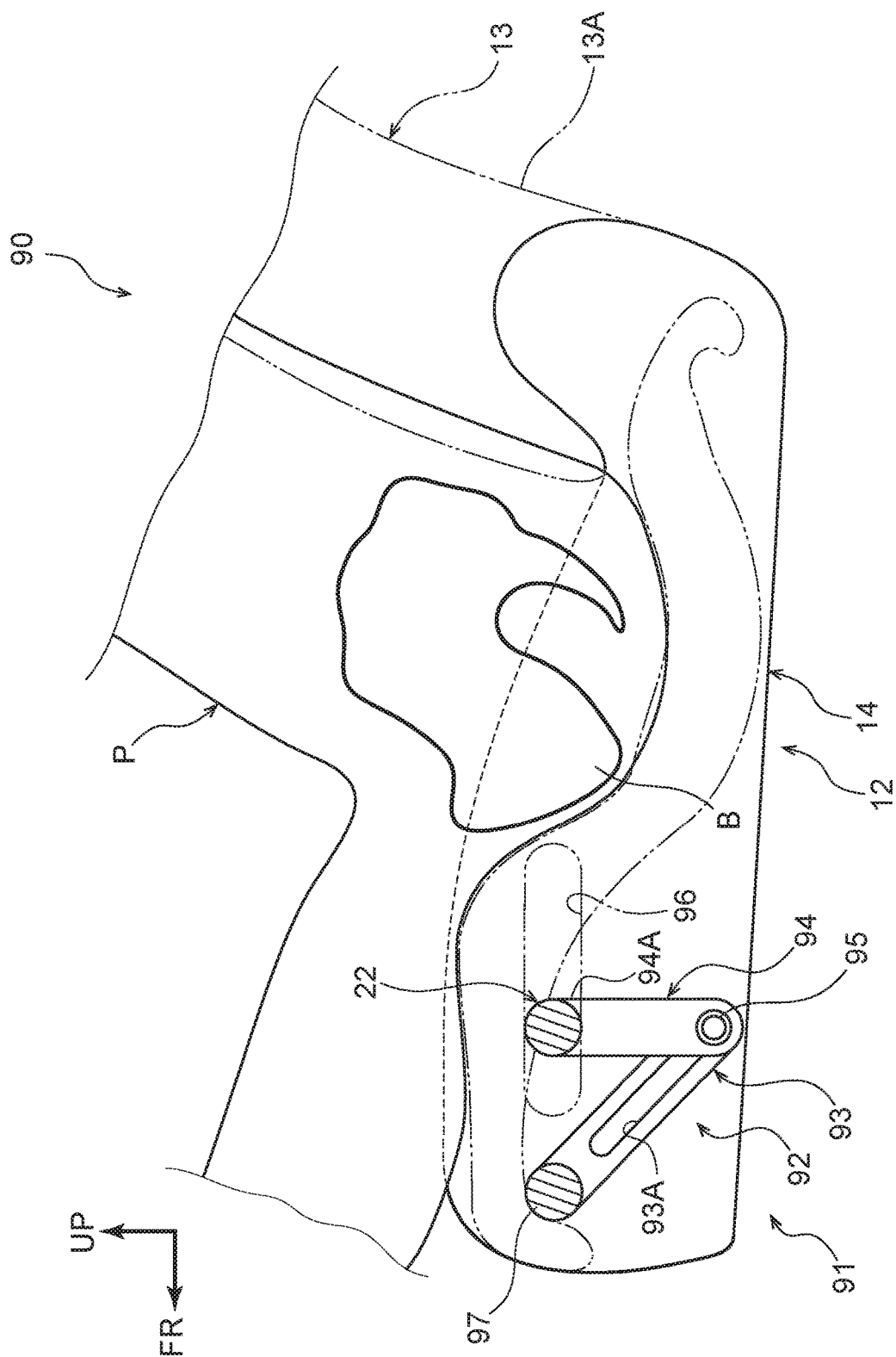
FIG. 17 is an enlarged side view showing a seat cushion structuring a vehicle seat according to a third exemplary embodiment, which is a view showing a state in which a pelvis movement suppression member is at an initial position.

As shown in FIG. 17, a vehicle seat 90 according to the present exemplary embodiment includes the seat cushion 12 and the seat back 13, similarly to the first exemplary embodiment. A movement suppression apparatus 91 is provided in the seat cushion 12. The movement suppression apparatus 91 is for suppressing movement of the seat occupant P toward the seat front during a collision of the vehicle. Details of the movement suppression apparatus 91 are described below.

—The Movement Suppression Apparatus—

The movement suppression apparatus 91 is disposed at the seat front side of the seat cushion 12 and is provided with a link member 92 that is attached to the seat cushion frame 14. The link member 92 includes a long, narrow first link 93 and a long, narrow second link 94. A front end portion of the first link 93 is turnably attached to the seat cushion frame 14 via a turning axle 97. A long hole 93A is formed in the first link 93. A connecting shaft 95 is inserted through the long hole 93A to be movable.

The second link 94 is connected to the first link 93 via the connecting shaft 95. Thus, the second link 94 is connected to be turnable relative to the first link 93. The pelvis movement suppression member 22 is attached to one end portion 94A of the first link 93, which is at the opposite side of the first link 93 from an end portion thereof at which the connecting shaft 95 is provided.

The pelvis movement suppression member 22 extends in the seat width direction, and is movable in the seat front-and-rear direction along guide holes 96 formed in the seat cushion frame 14.

The connecting shaft 95 is structured so as to be moved to the seat upper side by a moving mechanism that is not shown in the drawings. In the present exemplary embodiment, the connecting shaft 95 is moved toward the seat upper side in response to signals from the ECU 32 (see FIG. 4).

Figure 18:
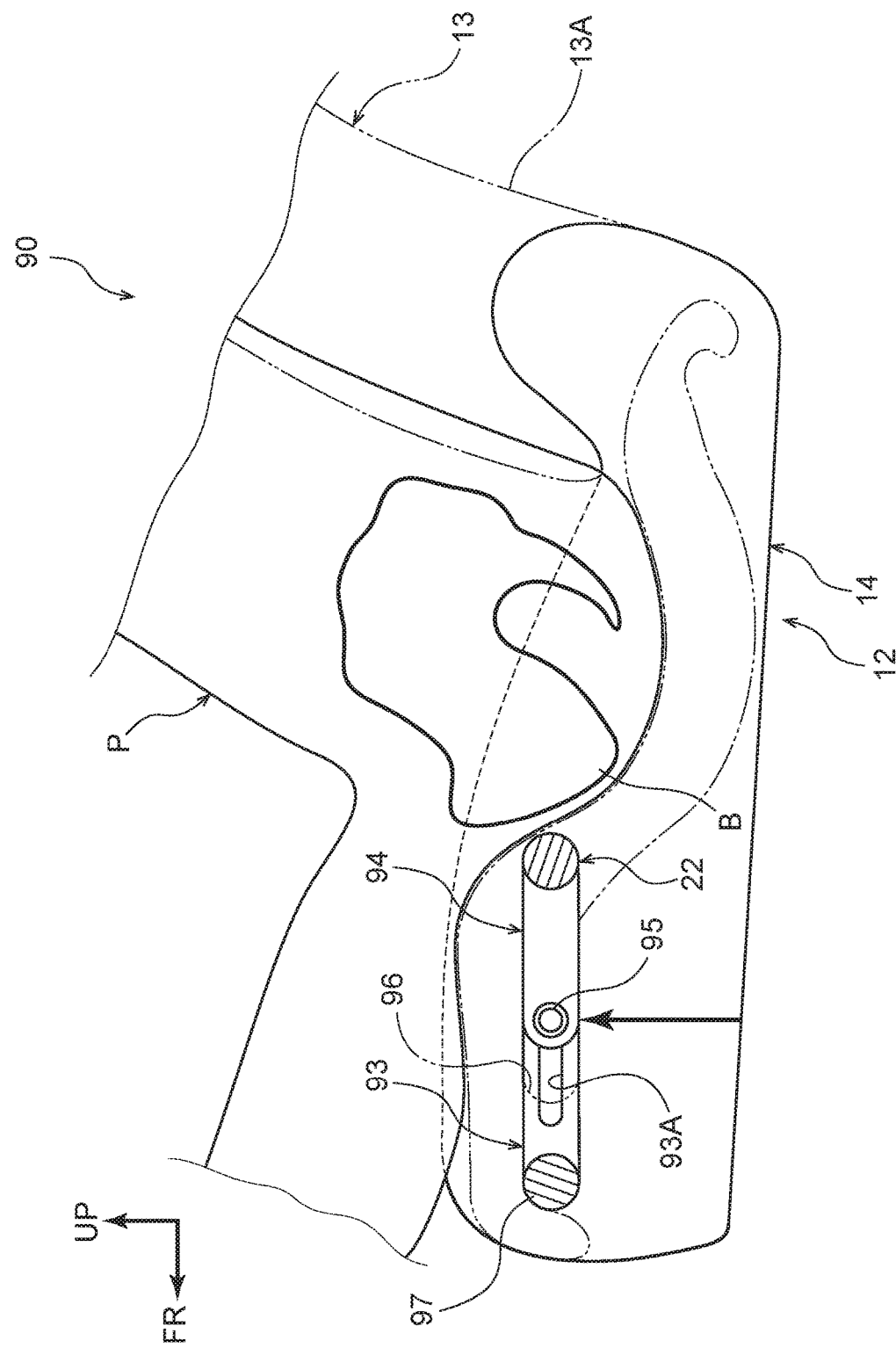
FIG. 18 is an enlarged side view showing the seat cushion structuring the vehicle seat according to the third exemplary embodiment, which is a view showing a state in which the pelvis movement suppression member has moved to a restraining position.

When the connecting shaft 95 moves toward the seat upper side, as shown in FIG. 18, the first link 93 turns around the turning axle 97 and the second link 94 turns around the connecting shaft 95. As a result, the pelvis movement suppression member 22 moves along the guide holes 96 to the restraining position at the seat rear side.

When a load acts on the pelvis movement suppression member 22 in the direction from the restraining position toward the initial position (toward the seat front side), the connecting shaft 95 moves toward the seat front side along the long hole 93A and the pelvis movement suppression member 22 moves toward the seat front side. At this time, at least a portion of the load is absorbed by an energy-absorbing mechanism, which is not shown in the drawings. The energy absorption direction according to this energy-absorbing mechanism is a substantially horizontal direction.

As the energy absorbing mechanism, for example, a compression coil spring may extend between the turning axle 97 and the connecting shaft 95 and the load may be absorbed by this compression coil spring, or the load may be absorbed by an alternative structure.

—Operation—

Now, operation of the present exemplary embodiment is described.

In the vehicle seat 90 according to the present exemplary embodiment, because the pelvis movement suppression member 22 moves to the restraining position when a collision of the vehicle is detected or predicted, movement of the ischial bones B of the seat occupant P toward the seat front side may be suppressed and submarining may be suppressed. Subsequent to this movement, when a load acts on the pelvis movement suppression member 22 in the direction from the restraining position toward the initial position, at least a portion of the load may be absorbed. In other words, during a collision, both submarining may be suppressed and a load against the seat occupant P may be moderated. Other operations are similar to the first exemplary embodiment.

Hereabove, vehicle seats according to the first to third exemplary embodiments are described, but it will be clear that numerous embodiments are possible within a scope not departing from the gist of the present disclosure. For example, in the exemplary embodiments and variant examples described above, the energy absorption direction according to each energy-absorbing mechanism is a horizontal direction, but this is not limiting. The energy absorption direction may be a front-upward direction that steadily approaches the seat upper side toward the seat front side. To be specific, in FIG. 4B, the case 24 as a whole may be angled to the front-upward direction, and thus the energy absorption direction may be set to the front-upward direction. That is, when a load is received from the seat occupant P, the pelvis movement suppression member 22 moves diagonally upward from the restraining position toward the initial position along each guide hole 24A. At this time, at least a portion of the load is absorbed by each support portion 22C moving diagonally upward toward the seat front side in opposition to the internal pressure of the bag body 30.

In the exemplary embodiments and variant examples described above, the moving mechanism is provided at both of the pair of left and right side frames 14A structuring the seat cushion frame 14, but this is not limiting. For example, in the first exemplary embodiment shown in FIG. 2, the moving mechanism 26 (see FIG. 4) may be provided at only one of the side frames 14A. In this case, movement of the ischial bones B of the seat occupant P toward the seat front side may be suppressed by the pelvis movement suppression member 22 moving along the guide hole 24A at the other of the side frames 14A, and submarining may be suppressed. Even when the moving mechanism 26 is provided at only one of the side frames 14A, the energy-absorbing mechanism may be provided at both of the side frames 14A, and a load may be absorbed equally at left and right.

In the exemplary embodiments and variant examples described above, the restraining position is located to be spaced apart to the seat front side from the ischial bones B of the seat occupant P, but this is not limiting. For example, a structure may be employed that moves the pelvis movement suppression member toward the seat rear side as far as a position abutting against the ischial bones B of the seat occupant P when a collision of the vehicle is predicted. This structure is described with reference to FIG. 1. In FIG. 1, the restraining position is specified at the seat front side relative to the sitting position of the seat occupant P that is shown by two-dot chain lines. When a collision that would move the seat occupant P toward the seat front side is detected or predicted, each moving mechanism 26 (see FIG. 4) is activated and the pelvis movement suppression member 22 is moved toward the restraining position. In contrast, a structure may be formed in which, for example, the restraining position is specified at the seat rear side relative to the position shown in FIG. 1 and the pelvis movement suppression member 22 is moved as far as the location of the ischial bones B at the sitting position of the seat occupant P shown by the two-dot chain lines. A structure that anchors the pelvis movement suppression member 22 at the restraining position with a stopper mechanism may be employed at this time. In this case, because the pelvis movement suppression member 22 moves to the restraining position when a collision is predicted, the ischial bones B are already in a state of being braced from the seat front side by the pelvis movement suppression member 22 at the time of the collision. Therefore, the seat occupant does not move by inertia toward the seat front side and a load against the seat occupant may be moderated.

What is claimed is:

1. A vehicle seat, comprising:
a pelvis movement suppression member that is disposed at an initial position at a seat upper side of a seat front side of a seat cushion, extends in a seat width direction, and is movable in a seat front-rear direction relative to a frame of the seat cushion;
a moving mechanism that moves the pelvis movement suppression member from the initial position to a restraining position at a seat rear side relative to the initial position;
a control section that, when a collision is detected or predicted, activates the moving mechanism to move the pelvis movement suppression member to the restraining position; and
an energy-absorbing mechanism that, when a load in a direction from the restraining position toward the initial position acts on the pelvis movement suppression member subsequent to the movement by the moving mechanism, absorbs at least a portion of the load,
wherein the pelvis movement suppression member is movable in a linear diagonal upward direction with respect to the vehicle seat, from the restraining position towards the initial position, and
an energy absorption direction of the energy-absorbing mechanism is the linear diagonal upward direction.

2. The vehicle seat according to claim 1, further comprising a stopper mechanism that anchors the pelvis movement suppression member at the initial position,
wherein, when a collision is detected or predicted, the control section releases the pelvis movement suppression member from a state of being anchored by the stopper mechanism.

3. The vehicle seat according to claim 1, wherein:
a support portion is provided at each end portion of the pelvis movement suppression member, the support portions being movable in the seat front-rear direction relative to the frame, and
the pelvis movement suppression member is moved from the initial position to the restraining position by the moving mechanism moving at least one of the support portions toward the seat rear side.

4. The vehicle seat according to claim 1, wherein, in plan view, the pelvis movement suppression member is formed in a U shape that protrudes toward the seat front side.

5. The vehicle seat according to claim 1, wherein the pelvis movement suppression member at the initial position is disposed at a location that, seen in the seat front-rear direction, is arranged to overlap with ischial bones of a seat occupant.

6. A vehicle seat, comprising:
a pelvis movement suppression member that is disposed at an initial position at a seat upper side of a seat front side of a seat cushion, extends in a seat width direction, and is movable in a seat front-rear direction relative to a frame of the seat cushion;
a moving mechanism that moves the pelvis movement suppression member from the initial position to a restraining position at a seat rear side relative to the initial position, the pelvis movement suppression member being configured to support ischial bones of a seat occupant at the restraining position;

a stopper mechanism that anchors the pelvis movement suppression member at the restraining position; and a control section that, when a collision is predicted, activates the moving mechanism to move the pelvis movement suppression member to the restraining position, and anchors the pelvis movement suppression member at the restraining position with the stopper mechanism, wherein the pelvis movement suppression member is movable in a linear diagonal upward direction with respect to the vehicle seat, from the restraining position towards the initial position.

7. The vehicle seat according to claim 6, wherein:

a support portion is provided at each end portion of the pelvis movement suppression member, the support portions being movable in the seat front-rear direction relative to the frame, and the pelvis movement suppression member is moved from the initial position to the restraining position by the moving mechanism moving at least one of the support portions toward the seat rear side.

8. The vehicle seat according to claim 6, wherein the pelvis movement suppression member at the initial position is disposed at a location that, seen in the seat front-rear direction, is configured to overlap with the ischial bones of the seat occupant.

* * * * *